(12) United States Patent
Bertolini et al.

(10) Patent No.: US 12,719,351 B2
(45) Date of Patent: Aug. 25, 2026

(54) TIME-BASED CONVERTER APPARATUS AND CORRESPONDING METHOD

(71) Applicant: STMicroelectronics International N.V., Geneva (CH)

(72) Inventors: Alessandro Bertolini, Vermiglio (IT); Germano Nicollini, Piacenza (IT); Alessandro Gasparini, Cusano Milanino (IT); Alberto Brunero, Cusano Milanino (IT); Alberto Cattani, Cislago (IT)

(73) Assignee: STMicroelectronics International N.V., Geneva (CH)

( * ) Notice: Subject to any disclaimer, the term of this patent is extended or adjusted under 35 U.S.C. 154(b) by 163 days.

(21) Appl. No.: 18/829,765

(22) Filed: Sep. 10, 2024

(65) Prior Publication Data

US 2025/0088090 A1 Mar. 13, 2025

(30) Foreign Application Priority Data

Sep. 13, 2023 (IT) ........................ 102023000018765

(51) Int. Cl.
*H02M 3/158* (2006.01)
*H02M 1/088* (2006.01)

(52) U.S. Cl.
CPC ........... *H02M 1/088* (2013.01); *H02M 3/158* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225;

(Continued)

(56) References Cited

U.S. PATENT DOCUMENTS 11,469,665 B2 * 10/2022 Bertolini ................. H03F 1/305
11,527,956 B2 * 12/2022 Bertolini ............... H02M 3/158

(Continued)

OTHER PUBLICATIONS

IT Search Report and Written Opinion for priority application, IT Appl. No. 102023000018765, report dated Apr. 4, 2024, 10 pgs.

(Continued)

*Primary Examiner* — Jeffrey A Gblende
(74) *Attorney, Agent, or Firm* — Crowe & Dunlevy LLC

(57) ABSTRACT

A time-based DC-DC converter is controlled in response to a first oscillator signal based on a first control signal, a second oscillator signal based on a second control signal and a controlled current based on a feedback control signal. The first control signal and the second control signal are a function of the controlled current. The feedback control signal is generated as a function of the first and second oscillator signals by: generating at least two binary signals including a first binary signal based on a difference between the first oscillator signal and the reference signal and a second binary signal based on a difference between the second oscillator signal and the reference signal; and generating via a charge pump the feedback control signal based on the first binary signal and the second binary signal.

20 Claims, 10 Drawing Sheets

(58) Field of Classification Search
CPC .......... G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | | |
|---|---|---|---|---|
| 12,062,981 | B2 * | 8/2024 | Gasparini | H02M 1/0025 |
| 2006/0103476 | A1 | 5/2006 | Chen | |

OTHER PUBLICATIONS

Kim, Seong Joong, et al.: "A 4-Phase 30-70 MHz Switching Frequency Buck Converter Using a Time-Based Compensator," IEEE Journal of Solid-State Circuits, vol. 50, No. 12, Dec. 2015, 11 pgs.

Zhao, Jianming, et al.: "A 310-nA Quiescent Current 3-fs-FoM Fully Integrated Capacitorless Time-Domain LDO With Event-Driven Charge Pump and Feedforward Transient Enhancement," IEEE Journal of Solid-State Circuits, vol. 56, No. 10, Oct. 2021, 10 pgs.

Lee, Changuk, et al.: "A Miniaturized Wireless Neural Implant With Body-Coupled Power Delivery and Data Transmission," IEEE Journal of Solid-State Cicuits, vol. 57, No. 11, Nov. 2022, 16 pgs.

Danesh, Mohammadhadi, et al.: "0.43nJ, 0.48pJ/step Second-Order ΔΣ Current-to-Digital Converter for IoT Applications," IEEE, 2019, 5 pgs.

* cited by examiner

VY
404
$I_{VY}$
406
$N_2$
$V_{VY}^{TH}$
$MN_{REPLICAFET}$
$LS_{ON/OFF}$
GND
40
40'

$V_{DD}$
$M_{N7}$
$M_{N5}$
$I_{SENSE}$
$V_{SENSE}$
$R_2$
$M_{N2}$
$T_{OUT}$
$V_{CASC}$
$EN_{SENSE}$
L
$I_L$
$D_1$
$M_{N8}$
$M_{N6}$
$M_{N3}$
$V_1$
$R_1$
$M_{N1}$
$D_2$
LX
$MN_{POWERFET}$
$V_G$
$V_R$
$M_{N4}$
400
$V^{IN}_{OFFSET}$

TIME-BASED CONVERTER APPARATUS AND CORRESPONDING METHOD

PRIORITY CLAIM

This application claims the priority benefit of Italian Application for Patent No. 102023000018765 filed on Sep. 13, 2023, the content of which is hereby incorporated by reference in its entirety to the maximum extent allowable by law.

TECHNICAL FIELD

The description relates to a converter apparatus.

One or more embodiments can be applied to time-based DC-DC converters.

BACKGROUND

DC-DC converters are electronic circuits that can convert sources of direct current (DC) from a first voltage level to a second voltage level, operating as electric power converters.

Usually, a DC-DC converter comprises a pair of switching transistors, for instance, power switches, driven by a Pulse-Width Modulated (PWM) control signal.

Time-based DC-DC converters are a type of DC-DC converter with time-based control loops, such control loops being configured to use occurrences of rising/falling edges of binary signals to produce the control signal, for instance, such PWM signal, feeding the drivers of the power switches.

FIG. 1 illustrates an exemplary circuit 10 used to generate a PWM signal to be used in a control loop of a time-based DC-DC converter.

It is noted that in the references used for the figures described herein, the subscript R stands for "Reference", while the subscript F stands for "Feedback".

The exemplary circuit illustrated in FIG. 1 is configured to generate a Pulse-Width Modulated (PWM) signal $D_{PWM}$ with a given duty cycle, using a phase detector PD.

Such phase detector PD is configured to receive a pair of input signals through its input terminals and to generate at its output terminal such PWM signal $D_{PWM}$ as a function of the difference between the phases of the two received input signals, that is, a first delayed input signal $S_{R,PID}$ with a corresponding phase $\Phi_{R,PID}$ received at a first input terminal and a second delayed input signal $S_{F,PID}$ with a corresponding phase $\Phi_{F,PID}$ received at a second input terminal.

The first delayed input signal $S_{R,PID}$ is generated by a first current controlled delay line $CCDL_R$ that is configured to generate such first delayed input signal $S_{R,PID}$ by delaying a first input signal $S_{R,I}$ with a corresponding phase $\Phi_{R,I}$ received from a first current controlled oscillator $CCO_R$, such delaying operation being performed as a function of a first control signal received from a first output terminal of a proportional and differential transconductor (e.g., a transconductance amplifier) $G_{MPD}$, for instance, by delaying such first input signal $S_{R,I}$ of a first time delay equal to $t_{d,CCDLr}$ (referring to FIG. 2).

Similarly, the second delayed input signal $S_{F,PID}$ is generated by a second current controlled delay line $CCDL_F$ that is configured to generate such second delayed input signal $S_{F,PID}$ by delaying a second input signal $S_{F,I}$ with a corresponding phase $\Phi_{F,I}$ received from a second current controlled oscillator $CCO_F$, such delaying operation being performed as a function of a second control signal received from a second output terminal of the proportional and differential transconductor $G_{MPD}$, for instance, by delaying such second input signal $S_{F,I}$ of a second time delay equal to $t_{d,CCDLf}$ (referring to FIG. 2).

Current controlled oscillators (CCOs) are generally configured to generate signals having specific frequencies, therefore: the first current controlled oscillator $CCO_R$ is configured to generate the first input signal $S_{R,I}$ whose frequency is determined as a function of a first control signal received from a first output terminal of a transconductor (e.g., a transconductance amplifier) $G_{MI}$ on the integral path; and the second current controlled oscillator $CCO_F$ is configured to generate the second input signal $S_{F,I}$ whose frequency is determined as a function of a second control signal received from a second output terminal of the transconductor $G_{MI}$ on the integral path.

It is noted that such current controlled oscillators (CCOs) are configured to act as integrators in a phase domain, thus, they are configured to perform actions of integration (that is, integral control) on signals received as input.

Therefore, it is noted that the transconductors, for instance, the transconductor $G_{MI}$ on the integral path, may not perform any integration action.

Such integration action may be accomplished (from the transconductor input to the current controlled oscillators CCOs output in phase domain) with both the transconductor $G_{MI}$ on the integral path and a current controlled oscillator CCO, thus, obtaining a Voltage-Controlled Oscillator (VCO).

Thus, such integration action may be performed by the current controlled oscillators CCOs, while the transconductor, for instance, the transconductor $G_{MI}$ on the integral path, may be seen as a simple scaling and/or conversion block, that is, constant and not frequency dependent.

Transconductors $G_M$ are generally configured to generate a pair of signals, for instance, a pair of current signals, as a function of a voltage difference that is computed from a first voltage level received at a non-inverting terminal and a second voltage level received at an inverting terminal. Therefore, the proportional and differential transconductor $G_{MPD}$ is configured to have its non-inverting terminal set to a reference voltage $V_{REF}$ and its inverting terminal set to a voltage $V_D$ that is the voltage measured on a differential side capacitor $C_D$, such differential side capacitor $C_D$ being coupled between a terminal receiving an output voltage $V_{OUT}$, that is, the voltage that is supplied by a converter to which the exemplary circuit 10 is coupled, and a terminal coupled to such reference voltage $V_{REF}$ through a differential side resistor $R_D$ (thus, obtaining a filter composed of such differential side capacitor $C_D$ and such differential side resistor $R_D$). Furthermore, the transconductor $G_{MI}$ on the integral path is configured to have its non-inverting terminal set to the reference voltage $V_{REF}$ and its inverting terminal set to the received output voltage $V_{OUT}$.

It is noted that the first current controlled delay line $CCDL_R$ and the second current controlled delay line $CCDL_F$ in conjunction with the filter composed of such differential side capacitor $C_D$ and such differential side resistor $R_D$ are generally configured to perform proportional and derivative actions (that is, proportional and derivative control) on signals received as input.

Therefore, a usual transfer function for a Proportional-Integral-Derivative (PID) compensator, that is, the transfer function obtained by processing an input signal with the current controlled oscillators, CCOs and the current controlled delay line CCDLs, is:

$$H_{PID}(s) = G_{G_{MPD}} K_{CCDL} + \frac{G_{G_{MI}} K_{CCO}}{s} + G_{G_{MPD}} K_{CCDL} C_D R_D s$$

wherein $G_{G_{MPD}}$ is the transfer function of the proportional and differential transconductor $G_{MPD}$, $K_{CCDL}$ is the transfer function of the current controlled delay line CCDLs, $G_{G_{MI}}$ is the transfer function of the transconductor $G_{MI}$ on the integral path, and $K_{CCO}$ is the transfer function of the current controlled oscillators CCOs.

It is noted that, as previously described, the combination of the transconductor $G_{MI}$ on the integral path with the current controlled oscillators CCOs may lead to Voltage-Controlled Oscillators (VCOs), that is, an oscillator receiving an input voltage and that is configured to convert such input voltage into a phase/frequency at the output.

Similarly, the combination of the proportional and differential transconductor $G_{MPD}$ with the controlled delay lines CCDLs may lead to Voltage-Controlled Delay Lines (VCDLs), that is, a delay line receiving an input voltage and that is configured to perform a delay operation as a function of such input voltage.

Therefore, the previously described transfer function may also be expressed as:

$$H_{PID}(s) = K_{VCDL} + \frac{K_{VCO}}{s} + K_{VCDL} C_D R_D s$$

wherein $K_{VCDL}$ is the transfer function of the defined voltage-controlled delay lines VCDLs, that is, $K_{VCDL}=G_{G_{MPD}} K_{CCDL}$, and $K_{VCO}$ is the transfer function of the defined voltage-controlled oscillators VCOs, that is, $K_{VCO}=G_{G_{MI}} K_{CCO}$.

The circuit of FIG. 1 is usually operated in its steady-state condition since the feedback created with the received output voltage $V_{OUT}$ (that is, the feedback obtained by using the voltage that is supplied by a converter to which the exemplary circuit 10 is coupled as input for the control loop and the exemplary circuit 10 used to generate the PWM signal $D_{PWM}$) forces (as illustrated in FIG. 2): the frequencies of the first input signal $S_{R,I}$ generated by the first current controlled oscillator $CCO_R$ and the second input signal $S_{F,I}$ generated by the second current controlled oscillator $CCO_F$ to be equal; and the first time delay $t_{d,CCDLr}$ introduced by the first current controlled delay line $CCDL_R$ and the second time delay $t_{d,CCDLf}$ introduced by the second current controlled delay line $CCDL_F$ to be equal.

FIG. 2 illustrates an exemplary behavior of some of the signals of the circuit of FIG. 1 operated in a steady-state condition.

FIG. 2 illustrates an exemplary behavior of the first input signal $S_{R,I}$ and the second input signal $S_{F,I}$, which are binary signals, that is, signals with only two states, for instance, a high logic level and a low logic level.

A phase difference $\Delta\Phi_{R,I-F,I}$ between such first input signal $S_{R,I}$ and such second input signal $S_{F,I}$ may be defined as the degree of how much one wave, for instance, such second input signal $S_{F,I}$ leads another wave, for instance, such first input signal $S_{R,I}$, in radians (that is, the angularity referred to one period), thus, as a difference between the phase of the first input signal $\Phi_{R,I}$ and the phase of the second input signal $\Phi_{F,I}$.

Such first input signal $S_{R,I}$ and such second input signal $S_{F,I}$ are thus delayed by the first current controlled delay line $CCDL_R$ of an amount equal to $t_{d,CCDLr}$ and the second current controlled delay line $CCDL_F$ of an amount equal to $t_{d,CCDLf}$ respectively, obtaining the first delayed input signal $S_{R,PID}$ and the second delayed input signal $S_{F,PID}$.

It is noted that in a steady state condition, since the first time delay $t_{d,CCDLr}$ introduced by the first current controlled delay line $CCDL_R$ and the second time delay $t_{d,CCDLf}$ introduced by the second current controlled delay line $CCDL_F$ are equal, the phase difference $\Delta\Phi$ between such first delayed input signal $S_{R,PID}$ and such second delayed input signal $S_{F,PID}$, obtained as a difference between the phase of the first delayed input signal $\Phi_{R,PID}$ and the phase of the second delayed input signal $\Phi_{F,PID}$, is equal to the phase difference $\Delta\Phi_{R,I-F,I}$ between such first input signal $S_{R,I}$ and such second input signal $S_{F,I}$.

It is noted that the phase difference $\Delta\Phi$ between such first delayed input signal $S_{R,PID}$ and such second delayed input signal $S_{F,PID}$ may be equal to the phase difference $\Delta\Phi_{R,I-F,I}$ between such first input signal $S_{R,I}$ and such second input signal $S_{F,I}$ even in presence of non-idealities, for instance, in presence of a first time delay $t_{d,CCDLr}$ not equal to the second time delay $t_{d,CCDLf}$ for some offset/mismatch.

In fact, in a steady-state condition the DC-DC converter loop is closed, that is, the time-based control loop is closed, therefore, the output regulation may impose a certain PWM signal $D_{PWM}$ and a precise $\Delta\Phi=P_{R,PID}-\Phi_{F,PID}$.

Hence, in presence of a residual mismatch between the first time delay $t_{d,CCDLr}$ and the second time delay $t_{d,CCDLf}$, the resulting effect in the phase domain may be compensated by the integral action performed by the defined voltage-controlled oscillators VCOs that temporarily accumulates the action to correct the error in the phase domain, leading to:

$$\Delta\Phi = \Phi_{R,PID} - \Phi_{F,PID} = \Phi_{R,I} - \Phi_{F,I} = \Delta\Phi_{R,I-F,I}$$

Therefore, in response to the circuit of FIG. 1 being operated in a steady-state condition, the PWM signal $D_{PWM}$ is determined as a function of the difference between the phases of the first delayed input signal $S_{R,PID}$ and the second delayed input signal $S_{F,PID}$ (equal to the difference between the phases of the first input signal $S_{R,I}$ and the second input signal $S_{F,I}$) according to the following equations:

$$\Delta\Phi = \Phi_{RPID} - \Phi_{FPID} = \Phi_{R,I} - \Phi_{F,I} = \Delta\Phi_{R,I-F,I}$$

$$D_{PWM} = \frac{\Delta\Phi}{2\pi}$$

and, if the DC-DC converter is a DC-DC buck converter, the following equation may also be considered:

$$D_{PWM} = \frac{\Delta\Phi}{2\pi} = \frac{V_{OUT}}{V_{IN}}$$

wherein $V_{IN}$ is the value of a voltage that supplies a half bridge (HS; LS) coupled to the output terminal of such phase detector PD (referring to FIG. 3).

FIG. 3 illustrates an exemplary time-based DC-DC converter 20, for instance, a DC-DC buck converter, with a control loop comprising a circuit used to generate a PWM signal.

The time-based DC-DC converter 20 of FIG. 3 is configured to supply an output voltage $V_{OUT}$, for instance, to a load coupled therewith, such output voltage $V_{OUT}$ being the voltage measured on an output capacitor $C_O$ that is coupled between ground GND and an inductor L, that is, a coil of the DC-DC converter.

Such output capacitor $C_O$ is alternately charged and discharged by a current flowing within such inductor L whose sign changes as a function of the PWM signal $D_{PWM}$ provided from a phase detector PD, for instance, the phase detector of FIG. 1.

Therefore, such inductor L is coupled with two switches that are configured to implement a half bridge structure and to commute in response to the PWM signal $D_{PWM}$ changing its state, for instance, from a high logic level to a low logic level and vice versa.

A high-side switch HS coupled between a terminal that is supplied with a voltage of value $V_{IN}$ and the inductor L (that is, a first node LX) and, for instance, is configured to be closed when the PWM signal $D_{PWM}$ is in a high logic level and to be opened when such PWM signal $D_{PWM}$ is in a low logic level.

A low-side switch LS coupled between such inductor L (that is, the first node LX) and ground GND and, for instance, is configured to be closed when the PWM signal $D_{PWM}$ is in a low logic level and to be opened when such PWM signal $D_{PWM}$ is in a high logic level.

The PWM signal $D_{PWM}$ is provided to the half bridge structure by a phase detector PD, for instance, the phase detector already described FIG. 1, such phase detector PD being configured to receive a pair of input signals through its input terminals and to generate at its output terminal such PWM signal $D_{PWM}$ as a function of the difference between the phases of the two received input signals, for instance, the signals already described in FIG. 1, that is, the first delayed input signal $S_{R,PID}$ with the corresponding phase $\Phi_{R,PID}$ and the second delayed input signal $S_{F,PID}$ with the corresponding phase $\Phi_{F,PID}$.

In the structure of FIG. 3 the proportional and differential transconductor $G_{MPD}$ of FIG. 1 is implemented using a pair of transconductors (as such implementation may benefit of structural symmetries and of more degree of freedom, for instance, the transfer function of the proportional and differential transconductor $G_{G_{MPD}}$ may be different from that of the transconductor $G_{MI}$ on the integral path $G_{G_{MI}}$) comprising:

a differential transconductor (transconductance amplifier) $G_{MD}$, configured to have its non-inverting terminal set to a reference voltage $V_{REF}$ and its inverting terminal set to a voltage $V_D$ that is the voltage measured on a differential side capacitor $C_D$, for instance, the differential side capacitor of FIG. 1, that is coupled between a terminal receiving the (feedback) output voltage $V_{OUT}$ and a terminal coupled to such reference voltage $V_{REF}$ through a differential side resistor $R_D$ (thus, obtaining a filter composed of such differential side capacitor $C_D$ and such differential side resistor $R_D$), and a proportional transconductor (transconductance amplifier) $G_{MP}$, configured to have its non-inverting terminal set to the reference voltage $V_{REF}$ and its inverting terminal set to a feedback voltage $V_{FB}$ that is the voltage measured on a second divider resistor $R_{D2}$ that is coupled between a terminal coupled to the ground GND and the terminal receiving the (feedback) output voltage $V_{OUT}$ through a first divider resistor $R_{D1}$ (thus, selecting the portion of such output voltage $V_{OUT}$ falling on such second divider resistor $R_{D2}$).

The negative output terminals of the differential transconductor $G_{MD}$ and the proportional transconductor $G_{MP}$ are coupled together, for instance, connecting such negative terminals directly together.

Similarly, the positive output terminals of the differential transconductor $G_{MD}$ and the proportional transconductor $G_{MP}$ are coupled together, for instance, connecting such positive terminals directly together.

Therefore, the first delayed input signal $S_{R,PID}$ is generated by a first current controlled delay line $CCDL_R$ that is configured to generate such first delayed input signal $S_{R,PID}$ by delaying a first input signal $S_{R,I}$ with a corresponding phase $\Phi_{R,I}$, for instance, the signal already described in FIG. 1, received from a first current controlled oscillator $CCO_R$, such delaying operation being performed as a function of a first control signal received from the two positive output terminals of the differential transconductor $G_{MD}$ and the proportional transconductor $G_{MP}$ which are coupled together, for instance, by delaying such first input signal $S_{R,I}$ of a first time delay equal to $t_{d,CCDLr}$ (referring to FIG. 2).

Similarly, the second delayed input signal $S_{F,PID}$ is generated by a second current controlled delay line $CCDL_F$ that is configured to generate such second delayed input signal $S_{F,PID}$ by delaying a second input signal $S_{F,I}$ with a corresponding phase $\Phi_{F,I}$, for instance, the signal already described in FIG. 1, received from a second current controlled oscillator $CCO_F$, such delaying operation being performed as a function of a second control signal received from the two negative output terminals of the differential transconductor $G_{MD}$ and the proportional transconductor $G_{MP}$ which are coupled together, for instance, by delaying such second input signal $S_{F,I}$ of a second time delay equal to $t_{d,CCDLf}$ (referring to FIG. 2).

Such first current controlled oscillator $CCO_R$ and such second current controlled oscillator $CCO_F$ have already been described in FIG. 1, therefore, a description of these elements is not repeated herein to not overburden the present description.

Such first current controlled oscillator $CCO_R$ and such second current controlled oscillator $CCO_F$ are controlled through signals provided by a transconductor (transconductance amplifier) $G_{MI}$ on the integral path that is configured to have its non-inverting terminal set to the reference voltage $V_{REF}$ and its inverting terminal set to the feedback voltage $V_{FB}$.

In addition, both the negative output terminal and the positive output terminal of such transconductor $G_{MI}$ on the integral path are coupled with respective outputs of a current generator 200, such current generator 200 being configured to be supplied with a voltage VCC and to provide a common-mode current of value $I_{CM\_CCO}$ to such current controlled oscillators CCOs.

It is noted that in a steady state condition, that is, when the control loop is closed, the feedback voltage $V_{FB}$ is equal to the reference voltage $V_{REF}$, thus, the first current controlled oscillator $CCO_R$ and the second current controlled oscillator $CCO_F$ are configured to generate respective signals (as previously described) that are characterized by a same frequency, such frequency being also the switching frequency of the PWM signal $D_{PWM}$:

$$F_{SW} = F_{S_{R,I}} = F_{S_{F,I}}$$

wherein $F_{SW}$ is the switching frequency of the PWM signal $D_{PWM}$, $F_{S_{R,I}}$, is the frequency of the first input signal $S_{R,I}$, that is, the frequency of the signal generated by the first current controlled oscillator $CCO_R$, and $F_{S_{F,I}}$ is the frequency of the second input signal $S_{F,I}$, that is, the frequency of the signal generated by the second current controlled oscillator $CCO_F$.

In such a condition, all the differential currents provided as output by the transconductors $G_M$ have a value substantially equal to zero (that is, equal to zero but considering a given tolerance), therefore, referring to FIG. 3:

$$i_D \cong 0\,\text{A}$$

$$i_P \cong 0\,\text{A}$$

$$i_I \cong 0\,\text{A}$$

with $i_D$ being the differential output current provided as output by the differential transconductor $G_{MD}$, $i_p$ being the differential output current provided as output by the proportional transconductor $G_{MP}$, and $i_I$ being the differential output current provided as output by the transconductor $G_{MI}$ on the integral path.

If the differential current $i_I$ provided as output by the transconductor $G_{MI}$ on the integral path is substantially equal to zero, the first current controlled oscillator $CCO_R$ and the second current controlled oscillator $CCO_F$ are controlled with a same control signal, that is, are equally biased with the common-mode current $I_{CM\_CCO}$.

Therefore, such switching frequency of the PWM signal $D_{PWM}$ is obtained as a function of such common-mode current $I_{CM\_CCO}$, which is nominally constant across different operating conditions, that is, different chosen values of the voltage $V_{IN}$, the output voltage $V_{OUT}$, the load current $I_{LOAD}$ flowing within a load coupled to such exemplary time-based DC-DC converter 20, and/or any other operating condition.

It is noted that it would be advantageous to have the possibility of controlling and monitoring such switching activity, for instance, by controlling and monitoring the switching of the PWM signal $D_{PWM}$ and that of the time-based DC-DC converter 20, instead of having a fixed, uncontrolled and unmonitored switching that depends on such constant common-mode current $I_{CM\_CCO}$.

Solutions to facilitate controlling and monitoring the switching activity of a time-based DC-DC converter without impacting its regulation would be beneficial in order to increase the corresponding performance.

There is a need in the art to contribute in providing such a solution.

SUMMARY

One or more embodiments relate to an apparatus.

One or more embodiments relate to a corresponding method.

Solutions as described herein facilitate obtaining time-based DC-DC converters comprising an additional negative feedback loop, such negative feedback loop comprising: a pair of phase detectors configured to detect the common-mode frequency of signals received by current controlled oscillators of a corresponding DC-DC converter and to obtain balanced PWM signals; and an up/down charge pump comprising, for instance, a filtering stage, and configured to receive such balanced PWM signals and to generate (as a function of such balanced PWM signals) a control signal used to close such negative feedback loop by acting on a controlled current generator, such controlled current generator being configured to provide a biasing current to such current controlled oscillators of the corresponding DC-DC converter.

Solutions as described herein may include an additional low-side current sensor used to sense the current flowing within a coil of a DC-DC converter in order to facilitate further controlling and monitoring strategies, such sensing being performed by DC-shifting (and amplifying) such current flowing within the coil.

Solutions as described herein facilitate controlling and monitoring the switching activity of a time-based DC-DC converter without impacting its regulation in order to increase the corresponding performance.

BRIEF DESCRIPTION OF THE DRAWINGS

One or more embodiments will now be described, by way of example only, with reference to the annexed figures, wherein.

DETAILED DESCRIPTION

Figure 1:
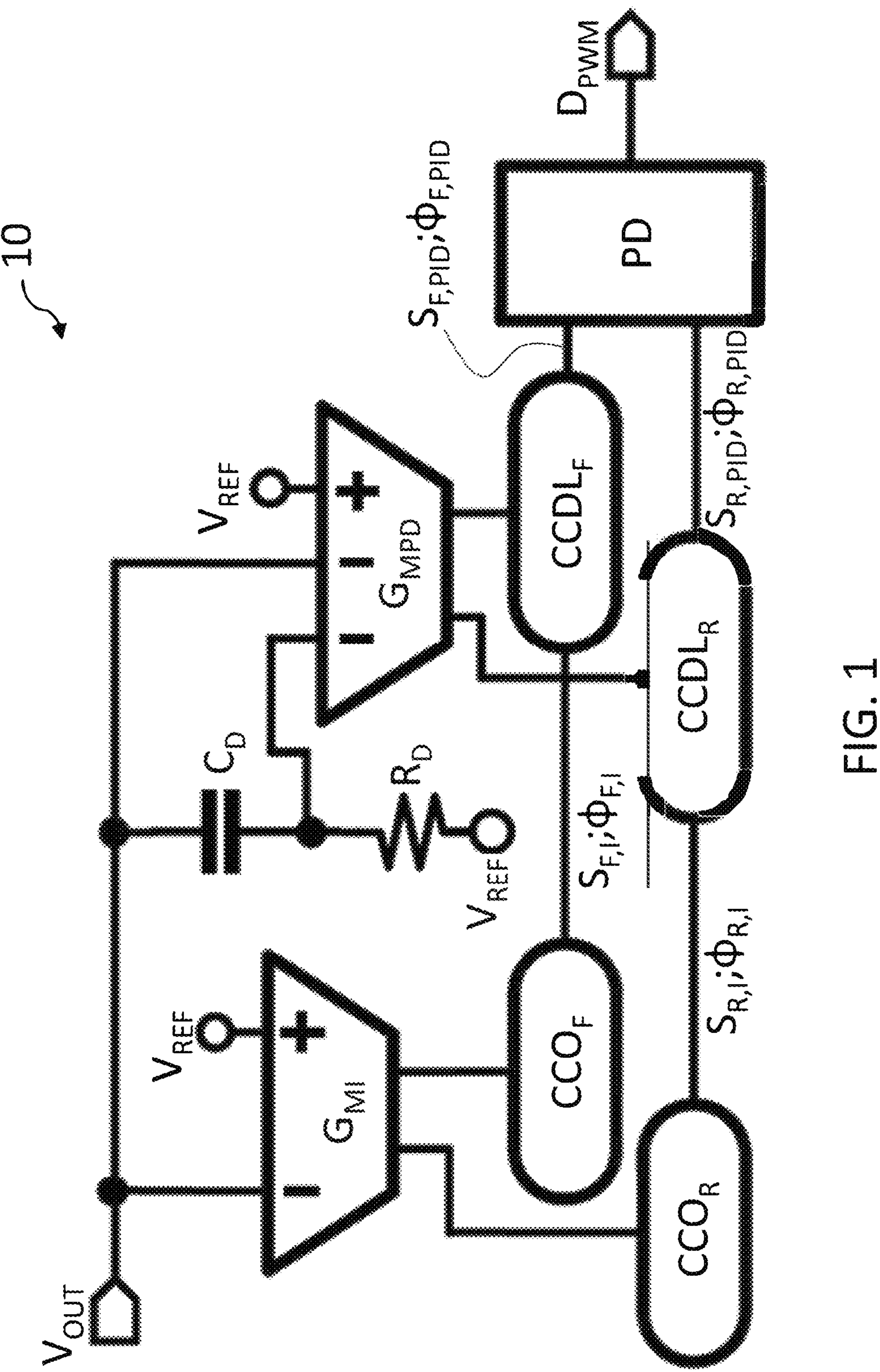
FIG. 1 is an exemplary circuit used to generate a PWM signal to be used in a control loop of a time-based DC-DC converter, as already described.

Corresponding numerals and symbols in the different figures generally refer to corresponding parts unless otherwise indicated.

The figures are drawn to clearly illustrate the relevant aspects of the embodiments and are not necessarily drawn to scale.

The edges of features drawn in the figures do not necessarily indicate the termination of the extent of the feature.

In the ensuing description one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular configurations, structures, or characteristics may be combined in any adequate way in one or more embodiments.

The headings/references used herein are provided merely for convenience and hence do not define the extent of protection or the scope of the embodiments.

For simplicity and ease of explanation, throughout this description, and unless the context indicates otherwise, like parts or elements are indicated in the various figures with like reference signs, and a corresponding description will not be repeated for each and every figure.

As previously described, solutions as disclosed herein facilitate controlling and monitoring the switching activity of a time-based DC-DC converter without impacting its regulation in order to increase the corresponding performance.

For instance, instead of having the switching of the PWM signal $D_{PWM}$, and consequently, the switching of the time-based DC-DC converter, depending on such constant common-mode current $I_{CM\_CCO}$, it would be advantageous to have the possibility of controlling such switching activity, for instance, by aligning it with a provided clock or external/internal signal.

In fact, many applicative scenarios require an alignment of the switching activity of a time-based DC-DC converter with a given clock or signal, for instance, a selected reference clock or reference signal, either internally generated or provided from an external unit.

Non-exhaustive examples of such applications that require a time-based DC-DC converter configured to switch according to a given clock/signal may be:

- applications wherein a system sensitive to noise and/or interference, for instance, a Nyquist data converter, is physically placed near to a time-based DC-DC converter (for instance, the system sensitive to noise and/or interference is deployed on the same chip of a time-based DC-DC converter, for instance, within a Power Management Integrated Circuit (PMIC) or System on Chip (SoC), or at Printed Circuit Board (PCB) level) and thus the performance of the system sensitive to noise and/or interference may be affected by the time-based DC-DC converter operations if the time-based DC-DC converter switching activity is not controlled;
- systems comprising oversampled Analog to Digital Converters (ADCs) and/or Digital to Analog Converters (DACs) in order to avoid further sampling disturbances injected by a time-based DC-DC converter, for instance, on the supply, ground, or common substrate;
- time-based DC-DC converters used as Phase-Locked Loop (PLL) reference alignments, for instance, for dynamic scaling, frequency hopping, frequency squelching, or the like;
- time-based DC-DC converters within a Power Management Integrated Circuit (PMIC), System on Chip (SoC), or in general where more Switched-Mode Power Supply (SMPS) are present, for instance, to maintain a proper separation in order to solve Electro-Magnetic Interference (EMI) and ElectroMagnetic Compatibility (EMC) issues as interactions ("cross-talks") between different time-based DC-DC converters may lead to performance degradation;
- modulation schemes that leverage inherent large bandwidth of time-based DC-DC converters, for instance, envelope tracking, Radio-Frequency Power Amplifier (RF PA) power control via adaptive Direct Current (DC) power supply, or the like.

In addition, it is desired that such alignment of the switching activity of time-based DC-DC converters with given clocks/other signals may be provided without affecting the output regulation and performance of such time-based DC-DC converters and irrespective of the selected given clock or reference signal considered.

For instance, it is desirable to guarantee the output regulation even in presence of: Process, Voltage and Temperature (PVT) variations; different operation conditions and parameters, for instance, different values for one or more between the input voltage $V_{IN}$, the output voltage $V_{OUT}$, the inductor L, the output capacitor $C_O$, the switching frequency $F_{SW}$ of the PWM signal $D_{PWM}$; or different conditions that may happen after final-tests, packaging, and assembly, for instance, aging, soldering, or the like.

Embodiments of the solutions provided herein are based on the following observations and considerations:

- during a transient, the control loop of a time-based DC-DC converter reacts by changing the frequencies of the signals generated by current controlled oscillators CCOs, for instance, the frequency of the first input signal $S_{R,I}$ generated by the first current controlled oscillator $CCO_R$ and the frequency of the second input signal $S_{F,I}$ generated by the second current controlled oscillator $CCO_F$, in opposite directions (that is, in a complementary way), thus, acting in a differential mode;
- a negative feedback loop may be considered to favor the compensation of such differential mode affecting the behavior of the circuit during transients, but it is desirable that such negative feedback loop does not interfere with the control loop of the time-based DC-DC converter in order to try to avoid degrading its performance, causing instabilities, and/or generating a very slow transient response;
- as the signals generated by current controlled oscillators CCOs vary in opposite directions, a negative feedback loop sensitive only to the common-mode frequency of the signals generated by such current controlled oscillators CCOs is desirable; and
- it is noted that monitoring the frequency of a single signal within such time-based DC-DC converter may be inconvenient and misleading since such single signal may not faithfully represent the nominal switching frequency of the time-based DC-DC converter.

Figure 4:
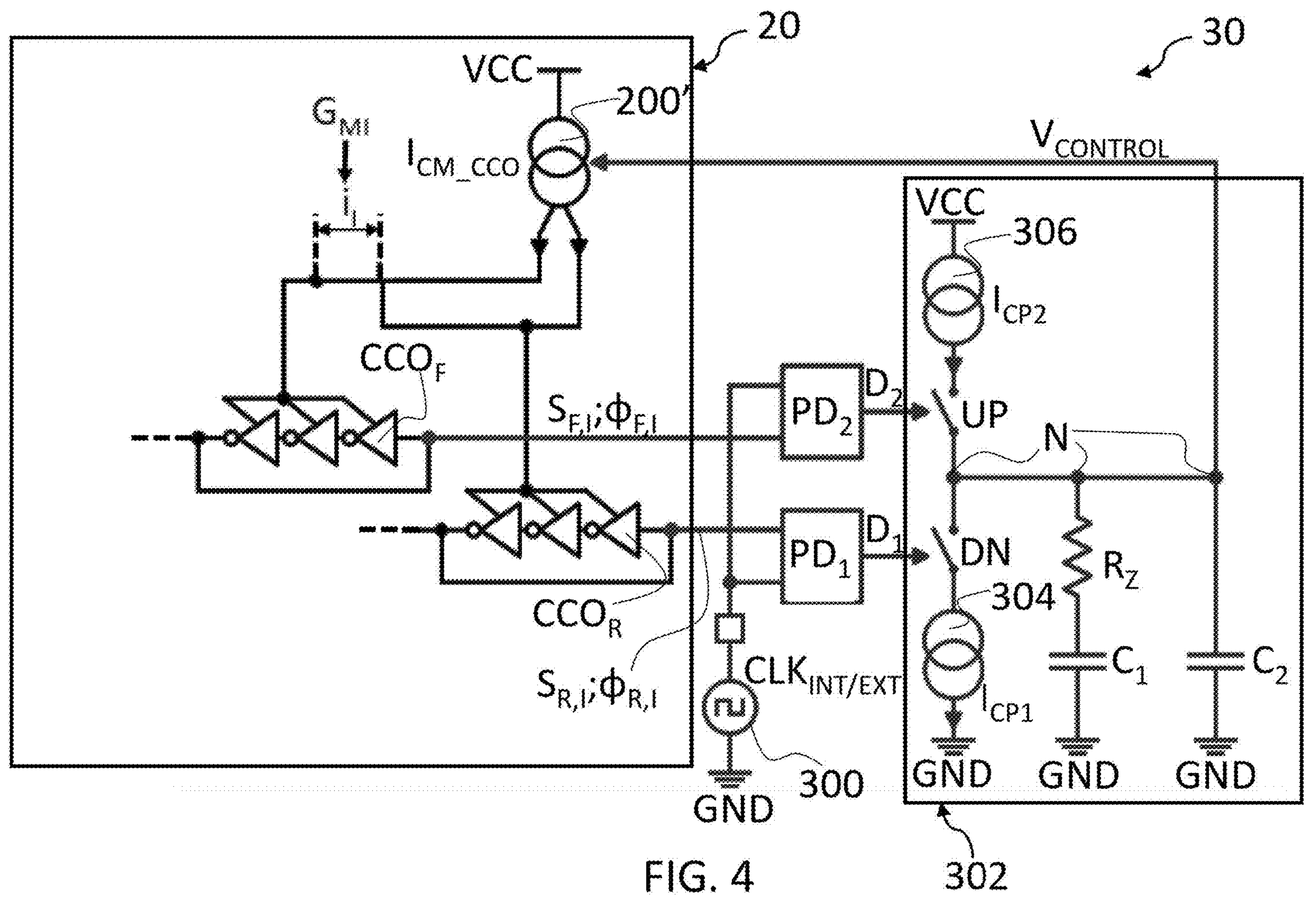
FIG. 4 and FIG. 5 are time-based DC-DC converters with a control loop comprising a circuit used to generate a PWM signal.

FIG. 4 is a time-based DC-DC converter 30 with a control loop comprising a circuit used to generate a PWM signal.

Figure 3:
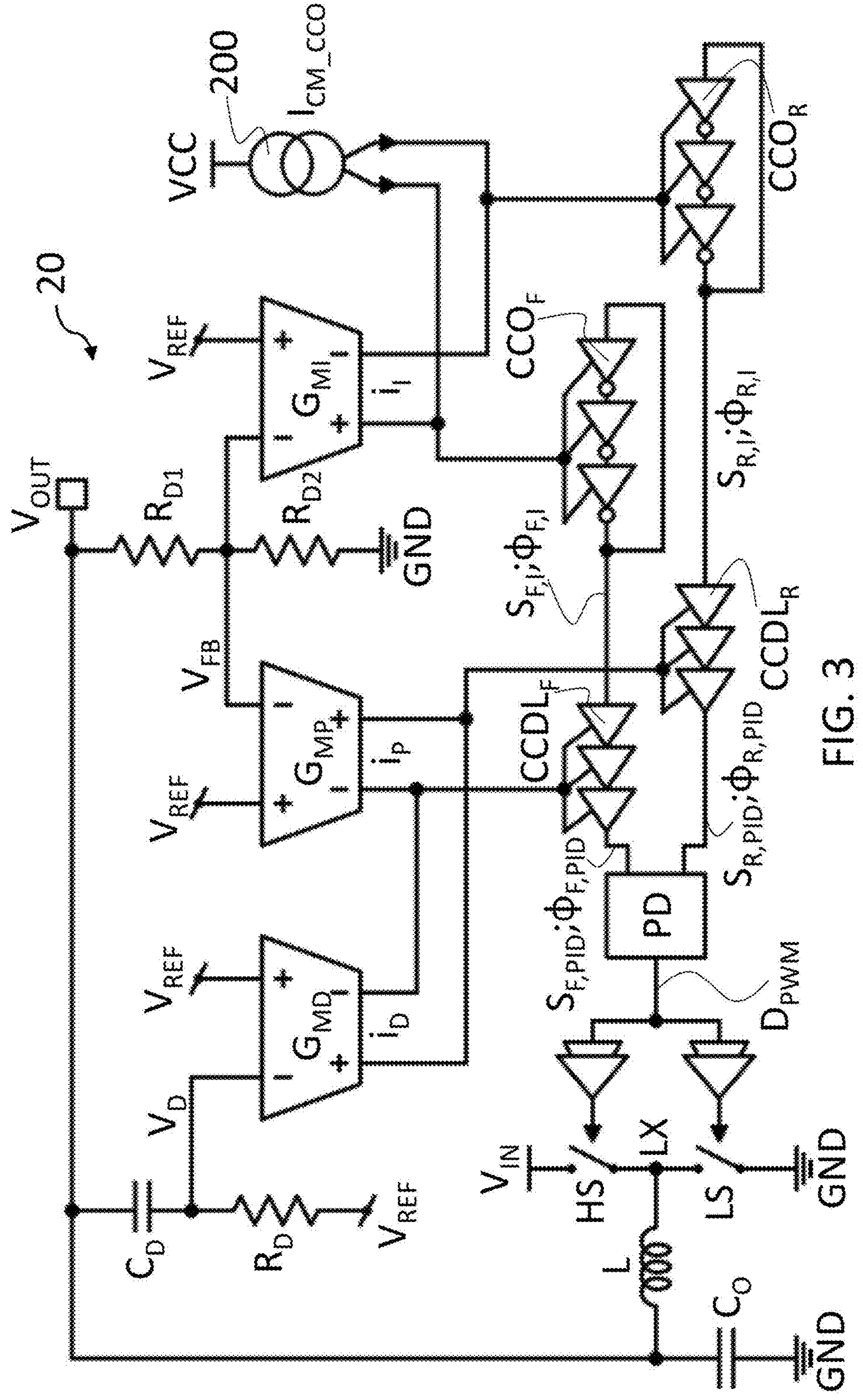
FIG. 3 is an exemplary time-based DC-DC converter with a control loop comprising a circuit used to generate a PWM signal, as already described.

It is noted that the circuit 30 illustrated in FIG. 4 comprises the circuit 20 of FIG. 3 (except for the current generator 200 which is substituted with a controlled current generator 200'), whose details are only partially reported therein in order to prioritize the clarity of the elements added in such FIG. 4.

It is noted that the components of such circuit 20 of FIG. 3 (except for the current generator 200) are therefore also comprised in such circuit 30 of FIG. 4, thus, a description for such components will not be reported in the following for the conciseness of the present description.

It is further noted that the current generator of FIG. 4 is the (only) component of the circuit 20 which is modified with respect to that of FIG. 3 since such current generator is further configured to be controlled by a feedback control signal, so it will be described again with reference to FIG. 4 and will be referred to as 200' in order to underline its difference from the current generator 200 of FIG. 3.

Figure 2:
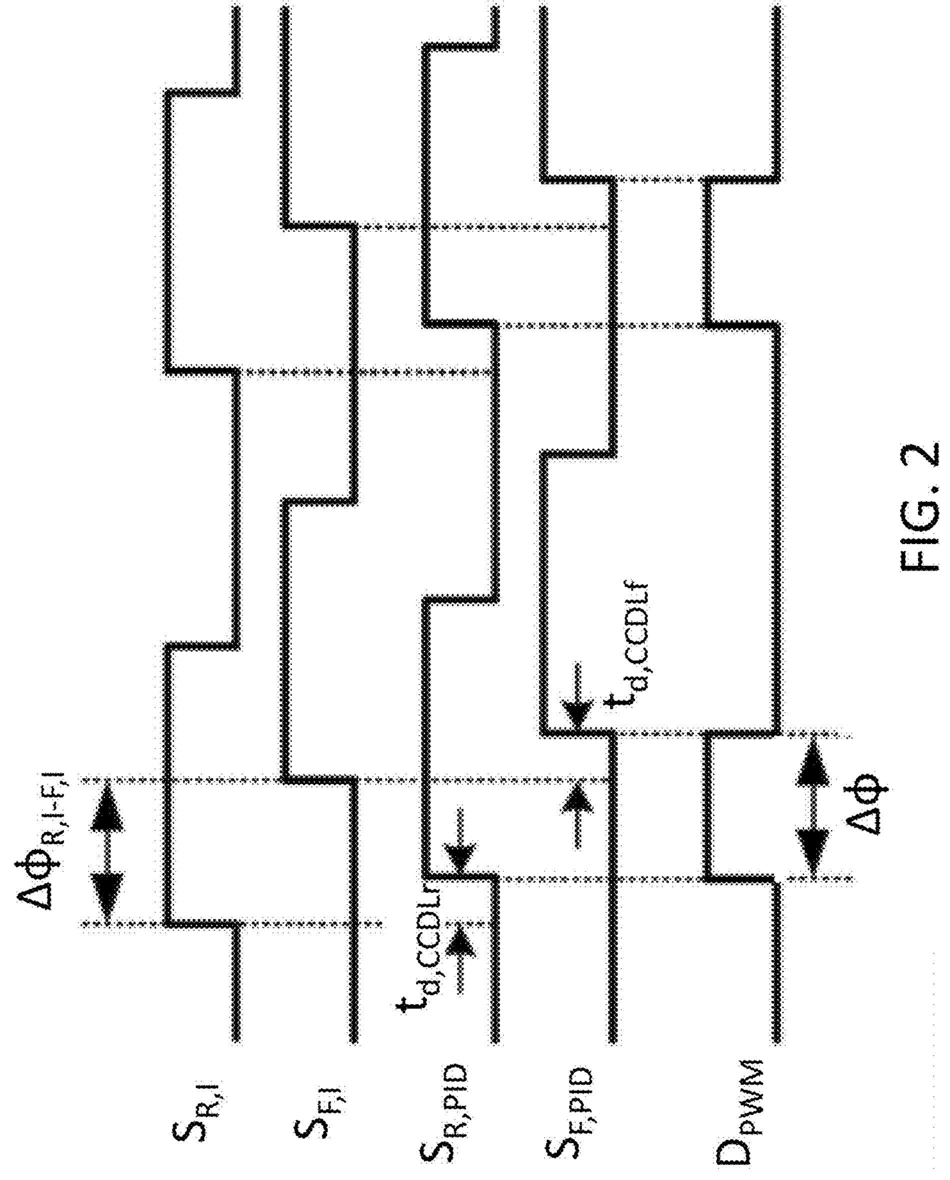
FIG. 2 is a time diagram illustrating an exemplary behavior of some of the signals of the circuit of FIG. 1 operated in a steady-state condition, as already described.

In addition, in the following description, parts, elements and/or components which have already been described with reference to FIGS. 1, 2, and 3 are denoted by the same references previously used in such figures and their description will not be repeated in the following to not overburden the present description.

The time-based DC-DC converter 30 of FIG. 4 contains additional components comprised in a negative feedback loop, such negative feedback loop being configured to be able to advantageously control and monitor the switching activity of such time-based DC-DC converter 30, for instance, aligning the frequency of the switching activity of the time-based DC-DC converter 30 with clock signals or any other binary signal either internally or externally generated.

The negative feedback loop, as previously described, may favor the filtering of the differential mode that affects the behavior of the DC-DC converter 30 during transients and, in addition, it may be desirable that such negative feedback loop does not interfere with the control loop of the time-based DC-DC converter, for instance, the loop described in FIG. 3.

In addition, the negative feedback loop as disclosed in FIG. 4 may advantageously (since the signals generated by the current controlled oscillators CCOs vary in opposite directions) be sensitive only to the common-mode frequency of the signals generated by the current controlled oscillators CCOs.

For instance, the negative feedback loop of the time-based DC-DC converter 30 of FIG. 4 may include a reference clock generator 300 (or a generator of any other binary signal) which is configured to generate a reference clock signal $CLK_{INT}$ (or a binary signal) that is used as a reference for aligning and locking the switching frequency of the time-based DC-DC converter 30 to the frequency of such reference clock signal $CLK_{INT}$.

Such reference clock generator 300 (or the generator of any other binary signal) may also be external with respect to the time-based DC-DC converter 30. In such case, such external reference clock generator 300 is configured to generate an external reference clock signal $CLK_{EXT}$ that is again used as a reference for aligning and locking the switching frequency of the time-based DC-DC converter 30 to the frequency of such external reference clock signal $CLK_{EXT}$.

It is noted that the reference $CLK_{INT/EXT}$ is used to indicate a reference clock signal that may be either internally generated or externally generated, thus, indicating either the reference clock signal $CLK_{INT}$ or the external reference clock signal $CLK_{EXT}$.

Similarly, the reference 300 is used to indicate a reference clock generator that may be either internal or external with respect to the time-based DC-DC converter 30.

To summarize, a reference signal, that is, the reference clock signal $CLK_{INT/EXT}$, having such reference phase $\Phi_{CLK}$ may comprise a clock signal (or any other binary signal used as reference) generated internally or externally.

Such reference clock signal $CLK_{INT/EXT}$ is provided as input to a first phase detector $PD_1$ and a second phase detector $PD_2$.

Such first phase detector $PD_1$ is configured to have its first terminal coupled to the first current controlled oscillator $CCO_R$ and its second terminal coupled to the reference clock generator 300, and to generate a first PWM signal $D_1$ as a function of the difference between the phases of the two signals received as input, that is, the first input signal $S_{R,I}$ with the corresponding phase $\Phi_{R,I}$ received at the first input terminal and the reference clock signal $CLK_{INT/EXT}$ with a corresponding phase $\Phi_{CLK}$ received at the second input terminal.

Such second phase detector $PD_2$ is configured to have its first terminal coupled to the reference clock generator 300 and its second terminal coupled to the second current controlled oscillator $CCO_F$, and to generate a second PWM signal $D_2$ as a function of the difference between the phases of the two signals received as input, that is, the reference clock signal $CLK_{INT/EXT}$ with the corresponding phase $\Phi_{CLK}$ received at the first input terminal and the second input signal $S_{F,I}$ with the corresponding phase $\Phi_{F,I}$ received at the second input terminal.

It is noted that such first phase detector $PD_1$ and such second phase detector $PD_2$ may be embedded within a controller, for instance, a digital controller, configured to control the operations of such time-based DC-DC converter 30, for instance, in order to manage the cycle-slipping (also known as "signal wrapping around 27") and extend its operation or to write, synthetize and verify a Hardware Description Language (HDL) code.

It is noted that such first phase detector $PD_1$ and such second phase detector $PD_2$ may also be phase frequency detectors PFDs, that are robust against cycle-slipping.

The first phase detector $PD_1$ and the second phase detector $PD_2$ control, through respectively generated output signals, that is, the first PWM signal $D_1$ and the second PWM signal $D_2$, an up/down charge pump 302 that is configured to generate a control signal $V_{CONTROL}$ as a function of such first PWM signal $D_1$ and second PWM signal $D_2$, for instance, using a filtering stage.

It is noted that the up/down charge pump 302 described in the following is merely an exemplary charge pump and any other configuration able to generate such control signal $V_{CONTROL}$ as a function of such first PWM signal $D_1$ and second PWM signal $D_2$ may be used, for instance, any other known charge pump.

For instance, a different up/down charge pump 302 that may be used as an alternative can be obtained by substituting a single capacitor to the filtering stage illustrated in FIG. 4 (comprising a first and a second capacitor $C_1$ and $C_2$, and a filtering resistor $R_Z$).

For instance, the first phase detector $PD_1$ is configured to set the first PWM signal $D_1$ to a high logic level in response to the detection of a rising edge of the first input signal $S_{R,I}$, and to reset such first PWM signal $D_1$ to a low logic level in response to the detection of a rising edge of the reference clock signal $CLK_{INT/EXT}$.

Similarly, for instance, the second phase detector $PD_2$ is configured to set the second PWM signal $D_2$ to a high logic level in response to the detection of a rising edge of the reference clock signal $CLK_{INT/EXT}$, and to reset such second PWM signal $D_2$ to a low logic level in response to the detection of a rising edge of the second input signal $S_{F,I}$.

It is noted that the logic levels of the signals are reported herein (and in the following description) by way of example only and alternatives, for instance, obtained by switching high logic levels with low logic levels, may also be considered.

The control signal $V_{CONTROL}$ closes the negative feedback loop by controlling the controlled current generator 200' in order to vary the value of the common-mode current $I_{CM\_CCO}$ provided by such controlled current generator 200', such controlled current generator 200' being configured to vary the value $I_{CM\_CCO}$ of the common-mode current provided to the current controlled oscillators CCOs as a function of such control signal $V_{CONTROL}$.

Therefore, such negative feedback loop may be configured to adjust the value $I_{CM\_CCO}$ of the common-mode current in order to obtain the following condition:

$$F_{SW} = F_{S_{R,I}} = F_{S_{F,I}} = F_{CLK}$$

wherein $F_{SW}$ is the switching frequency of the PWM signal $D_{PWM}$, $F_{S_{R,I}}$ is the frequency of the first input signal $S_{R,I}$, that is, the frequency of the signal generated by the first current controlled oscillator $CCO_R$, $F_{S_{F,I}}$ is the frequency of the second input signal $S_{F,I}$, that is, the frequency of the signal generated by the second current controlled oscillator $CCO_F$, and $F_{CLK}$ is the frequency of the reference clock signal $CLK_{INT/EXT}$.

Therefore, in a steady-state condition of the DC-DC converter 30 the frequency of the first input signal $\Phi_{R,I}$, the frequency of the second input signal $\Phi_{F,I}$, and the frequency of the reference clock signal $\Phi_{CLK}$ are substantially equal (considering a given threshold).

The up/down charge pump 302 is configured to receive the first PWM signal $D_1$ and the second PWM signal $D_2$, and to generate a control signal $V_{CONTROL}$ as a function of such received signals.

Such first PWM signal $D_1$ and such second PWM signal $D_2$ are used as control signals to control on/off switching actuation of a pair of switches DN and UP, respectively.

Thus, such first PWM signal $D_1$ is used to control switching of a first switch DN, for instance, such first switch DN being coupled between a second node N and ground GND through a first current generator 304 and being configured to be closed when the first PWM signal $D_1$ is set to a high logic level and to be opened when such first PWM signal $D_1$ is reset to a low logic level.

Similarly, such second PWM signal $D_2$ is used to control switching of a second switch UP, for instance, such second switch UP being coupled between the second node N and a terminal supplied with a first supply voltage VCC through a second current generator 306 and being configured to be closed when the second PWM signal $D_2$ is set to a high logic level and to be opened when such second PWM signal $D_2$ is reset to a low logic level.

The first current generator 304 and the second current generator 306 are configured to generate respective currents, that is, a first and second current $I_{CP1}$ and $I_{CP2}$ respectively, for instance, currents with the same value, that is, $I_{CP1}=I_{CP2}$.

A filtering stage is also coupled between the second node N and ground GND, such filtering stage being configured to provide the control signal $V_{CONTROL}$ as a function of a current flowing within the second node N.

For instance, such filtering stage may comprise: a first capacitor $C_1$, coupled between the second node N through a filtering resistor $R_Z$ and ground GND, and a second capacitor $C_2$, coupled between the second node N and ground GND, such control signal $V_{CONTROL}$ being the voltage measured on such second capacitor $C_2$.

It is noted that the current flowing within the second node N may inject or subtract an amount of charge into/from the first capacitor $C_1$ and the second capacitor $C_2$.

Such injected/subtracted amount of charge may be obtained as a function of both the first current $I_{CP1}$ flowing within the first switch DN and the second current $I_{CP2}$ flowing within the second switch UP.

In fact, the first current $I_{CP1}$ flowing within the first switch DN may subtract charges from such first and second capacitors $C_1$ and $C_2$, thus, discharging them, while the second current $I_{CP2}$ flowing within the second switch UP may inject charges in such first and second capacitors $C_1$ and $C_2$, thus, charging them.

Therefore, the resulting amount of charge injected/subtracted into/from such first and second capacitors $C_1$ and $C_2$ may depend on both the first current $I_{CP1}$ and the second current $I_{CP2}$.

In the following description the value of the first current $I_{CP1}$ flowing within the first switch DN is considered equal to that of $I_{CP2}$ flowing within the second switch UP, irrespective of their value, so that the amount of charge transferred (injected or subtracted) over a given time is equal for the first and second currents $I_{CP1}$ and $I_{CP2}$.

In a steady-state condition, that is, when the frequency $F_{S_{R,I}}$, of the first input signal $S_{R,I}$, that is, the frequency of the signal generated by the first current controlled oscillator $CCO_R$, is substantially equal (considering a given tolerance) to the frequency $F_{S_{F,I}}$ of the second input signal $S_{F,I}$, that is, the frequency of the signal generated by the second current controlled oscillator $CCO_F$, and during a complete switching cycle, that is, a complete period of the first input signal $S_{R,I}$ which is substantially equal to a complete period of the second input signal $S_{F,I}$, the amount of charge subtracted from such first and second capacitors $C_1$ and $C_2$ by the first current $I_{CP1}$ flowing within the first switch DN is substantially equal (considering a given tolerance) to the amount of charge injected into such first and second capacitors $C_1$ and $C_2$ by the second current $I_{CP2}$ flowing within the second switch UP.

It is noted that such an equality condition, that is, when the frequency $F_{S_{R,I}}$, of the first input signal $S_{R,I}$ is substantially equal to the frequency $F_{S_{F,I}}$ of the second input signal $S_{F,I}$, may be present when both the time-based control loop and the additional negative feedback loop are in steady-state and the reference clock signal $CLK_{INT/EXT}$ is in a steady state with a constant or fixed frequency value.

It is noted that after a period of time equal to a complete switching cycle, that is, at the end of such period of time equal to a complete switching cycle, the amount of charge subtracted from such first and second capacitors $C_1$ and $C_2$ is substantially equal (considering a given tolerance) to the amount of charge injected in such first and second capacitors $C_1$ and $C_2$, therefore, the value of the control signal $V_{CONTROL}$ obtained after such period of time is substantially equal (considering a given tolerance) to the value of the control signal $V_{CONTROL}$ measured before the same period of time.

Differently, when the time-based DC-DC converter 30 is in a transient condition (for instance, if there is a load transient, a line transient, or the like), the control loop of such time-based DC-DC converter reacts by varying the frequencies of the signals generated by current controlled oscillators CCOs (as previously described), for instance, the frequency of the first input signal $S_{R,I}$ generated by the first current controlled oscillator $CCO_R$ and the frequency of the second input signal $S_{F,I}$ generated by the second current controlled oscillator $CCO_F$, in opposite directions (in a complementary way), that is, acting in a differential mode.

It is noted that operating the circuit in such differential mode, leading to such frequency variations in opposite directions (complementarily), corresponds to operating such circuit with the frequency of one of the first input signal $S_{R,I}$ and the second input signal $S_{F,I}$ reduced by a given amount and the frequency of the other of the first input signal $S_{R,I}$ and the second input signal $S_{F,I}$ increased by the same given amount.

Therefore, as a consequence, the period of one of the first input signal $S_{R,I}$ and the second input signal $S_{F,I}$ is reduced by a given amount, while the period of the other of the first input signal $S_{R,I}$ and the second input signal $S_{F,I}$ is increased by the same given amount (thus, they change in a complementary way).

In response to the change of period of the first input signal $S_{R,I}$ and the second input signal $S_{F,I}$, the period of such first PWM signal $D_1$ and such second PWM signal $D_2$ is changed accordingly, that is, the period of such first PWM signal $D_1$ is increased/reduced according to changes in the first input signal $S_{R,I}$ and the period of such second PWM signal $D_2$ is reduced/increased according to changes in the second input signal $S_{F,I}$.

It is noted that such changes, that is, the increasement/reduction of the period of such first PWM signal $D_1$ according to changes in the first input signal $S_{R,I}$ and the increasement/reduction of the period of such second PWM signal $D_2$ according to changes in the second input signal $S_{F,I}$, may occur if the reference clock signal $CLK_{INT/EXT}$ is in a steady-state with a constant or fixed frequency value.

Therefore, the change of the period of such first PWM signal $D_1$ and such second PWM signal $D_2$ affect the amount of time in which the first switch DN and the second switch UP remain closed, respectively, thus, affecting the amount of time in which the first current $I_{CP1}$ flows within the first switch DN and the second current $I_{CP2}$ flows within the second switch UP, respectively.

Therefore, also in this case, the amount of time, that is, the period, in which the first switch DN and the second switch UP remain closed are affected in a complementary way.

Therefore, during a complete switching cycle, that is, the average period computed between the complete period of the first input signal $S_{R,I}$ and the complete period of the second input signal $S_{F,I}$ (since the change is in opposite directions, that is, in a complementary way), the amount of charge subtracted from such first and second capacitors $C_1$ and $C_2$ by the first current $I_{CP1}$ flowing within the first switch DN is again substantially equal (considering a given tolerance) to the amount of charge injected in such first and second capacitors $C_1$ and $C_2$ by the second current $I_{CP2}$ flowing within the second switch UP.

Therefore, again the value of the control signal $V_{CONTROL}$ obtained after such complete switching cycle is substantially equal (considering a given tolerance) to the value of the control signal $V_{CONTROL}$ measured before the same complete switching cycle.

Thus, in embodiments as that of FIG. 4, the introduced negative feedback loop is able to correctly reject the differential operating mode introduced with a transient condition.

If the reference clock generator 300 is replaced by a different reference clock generator 300 configured to generate a reference clock signal $CLK_{INT/EXT}$ with a different frequency value, and consequently, a different phase value, or is configured to generate multiple reference clock signal $CLK_{INT/EXT}$ and to switch from a first reference clock signal $CLK_{INT/EXT}$ to a second reference clock signal $CLK_{INT/EXT}$ whose frequency value (and consequently the phase value) is different from that of the first reference clock signal $CLK_{INT/EXT}$, then the negative feedback loop enters in a transient condition wherein the time amounts in which the first switch DN and the second switch UP remain closed vary in a non-complementary way, that is, of different amounts.

It is noted that operating the circuit in such a condition, leading to frequency changes that are not in opposite directions (non-complementarily), corresponds to operating such circuit with the frequency of one of the first input signal $S_{R,I}$ and the second input signal $S_{F,I}$ reduced by a first given amount and the frequency of the other of the first input signal $S_{R,I}$ and the second input signal $S_{F,I}$ increased by a second given amount, different from the first given amount.

In other words, operating the circuit in such a condition, leading to frequency changes that are not in opposite directions (non-complementarily), corresponds to operating such circuit with the frequencies of both the first input signal $S_{R,I}$ and the second input signal $S_{F,I}$, wherein such frequencies may be equal but oppositely increased or reduced by a given amount with respect to the frequency $F_{CLK}$ of the reference clock signal $CLK_{INT/EXT}$ (thus, the frequencies of both the first input signal $S_{R,I}$ and the second input signal $S_{F,I}$ are different from that of the reference clock signal $CLK_{INT/EXT}$).

Thus, more in general, the first input signal $S_{R,I}$ and the second input signal $S_{F,I}$ may operate with a common-mode frequency that is different from the frequency $F_{CLK}$ of the reference clock signal $CLK_{INT/EXT}$.

Thus, in such a non-complementary operative condition, the amount of charge subtracted from such first and second capacitors $C_1$ and $C_2$ is different from the amount of charge injected in such first and second capacitors $C_1$ and $C_2$, therefore, the value of the control signal $V_{CONTROL}$ varies over time until a new steady-state condition is reached.

For instance, if the injected amount of charge is higher than the subtracted amount of charge, the value of the control signal $V_{CONTROL}$ increases over time until a new steady-state condition is reached (with the control signal $V_{CONTROL}$ set to a higher value).

Otherwise, if the subtracted amount of charge is higher than the injected amount of charge, the value of the control signal $V_{CONTROL}$ decreases over time until a new steady-state condition is reached (with the control signal $V_{CONTROL}$ set to a lower value).

Thus, the reference phase $\Phi_{CLK}$, that is, the phase of the reference clock signal (CLK (and the corresponding frequency value of the reference clock signal $CLK_{INT/EXT}$), may be selectively variable out of a plurality of reference phases, that is, a set comprising desired phase values.

It is noted that in different steady-state operating conditions of the time-based DC-DC converter 30, that is, in operating conditions different from that wherein the reference clock signal $CLK_{INT/EXT}$ varies its frequency value (or a different reference clock signal $CLK_{INT/EXT}$ is selected), the amount of charge injected in the first and second capacitors $C_1$ and $C_2$ is substantially equal to the amount of charge subtracted from the same first and second capacitors $C_1$ and $C_2$, thus, obtaining a net charge injected/subtracted in/from such first and second capacitors $C_1$ and $C_2$ of the filtering stage being substantially zero.

It is also noted that within a complete switching cycle, that is, a complete period of the first input signal $S_{R,I}$ which is substantially equal to a complete period of the second input signal $S_{F,I}$ (in steady-state conditions) or the average period computed between the complete period of the first input signal $S_{R,I}$ and the complete period of the second input signal $S_{F,I}$ (in transient conditions), only the value of the ripple of the control signal $V_{CONTROL}$ may vary, while the average value of such control signal $V_{CONTROL}$ may remain constant and fixed.

Therefore, the filtering stage comprised in the up/down charge pump 302 of the negative feedback loop is a filtering stage configured to highly reject the differential-mode and to pass only the common-mode of the signals received as input from the circuitry 20.

To summarize, a DC-DC converter 30 as described herein comprises: a first current controlled oscillator $CCO_R$ configured to generate a first oscillator signal, that is, the first input signal $S_{R,I}$, with a first phase $\Phi_{R,I}$ based on a first control signal; and a second current controlled oscillator $CCO_F$ configured to generate a second oscillator signal, that is, the second input signal $S_{F,I}$, with a second phase $\Phi_{F,I}$ based on a second control signal.

The converter 30 further comprises: a controlled current generator 200' configured to generate a controlled current, that is, the common-mode current of value $I_{CM\_CCO}$, based on a feedback control signal $V_{CONTROL}$, wherein such first control signal and such second control signal are a function of such controlled current $I_{CM\_CCO}$; and a negative feedback loop configured to receive the first oscillator signal $S_{R,I}$ from the first current controlled oscillator $CCO_R$ and the second oscillator signal $S_{F,I}$ from the second current controlled oscillator $CCO_F$ and to generate the feedback control signal $V_{CONTROL}$ as a function of such first oscillator signal $S_{R,I}$ and such second oscillator signal $S_{F,I}$.

The negative feedback loop comprises: a detector configured to receive the first oscillator signal $S_{R,I}$ from the first current controlled oscillator $CCO_R$, the second oscillator signal $S_{F,I}$ from the second current controlled oscillator $CCO_F$, and a reference signal $CLK_{INT/EXT}$ with a reference phase $\Phi_{CLK}$ and to generate at least two binary signals comprising a first binary signal $D_1$ generated as a function of the difference between the reference phase $\Phi_{CLK}$ and the first phase $\Phi_{R,I}$ and a second binary signal $D_2$ generated as a function of the difference between the reference phase $\Phi_{CLK}$ and the second phase $\Phi_{F,I}$; and a charge pump 302 configured to receive the at least two binary signals and to generate the feedback control signal $V_{CONTROL}$ based on such at least two binary signals.

In embodiments, the detector may comprise: a first phase detector $PD_1$ configured to receive the first oscillator signal $S_{R,I}$ from the first current controlled oscillator $CCO_R$ and a reference signal, for instance, the reference clock signal $CLK_{INT/EXT}$, with a reference phase $\Phi_{CLK}$ and to generate a first binary signal, that is, the first PWM signal $D_1$, as a function of the difference between the reference phase $\Phi_{CLK}$ and the first phase $\Phi_{R,I}$; and a second phase detector $PD_2$ configured to receive the second oscillator signal $S_{F,I}$ from the second current controlled oscillator $CCO_F$ and the reference signal, for instance, the reference clock signal $CLK_{INT/EXT}$, with such reference phase $\Phi_{CLK}$ and to generate a second binary signal, that is, the second PWM signal $D_2$, as a function of the difference between the reference phase $\Phi_{CLK}$ and the second phase $\Phi_{F,I}$. The charge pump 302 is configured to receive the first binary signal $D_1$ from the first phase detector $PD_1$ and the second binary signal $D_2$ from the second phase detector $PD_2$, and to generate the feedback control signal $V_{CONTROL}$ based on the first binary signal $D_1$ and the second binary signal $D_2$.

In a steady-state condition of the DC-DC converter 30 the frequency $F_{S_{R,I}}$ of the first oscillator signal $S_{R,I}$, that is, the frequency of the first input signal $F_{S_{R,I}}$, the frequency $F_{S_{F,I}}$ of the second oscillator signal $S_{F,I}$, that is, the frequency of the second input signal $F_{S_{F,I}}$, and the frequency $F_{CLK}$ of the reference signal $CLK_{INT/EXT}$, that is, the frequency of the reference clock signal $F_{CLK}$, may be equal.

The charge pump 302 may comprise: a first charge pump current generator, that is, the first current generator 304, configured to be coupled to ground GND and to generate a first pump current, that is, the first current $I_{CP1}$; a second charge pump current generator, that is, the second current generator 306, configured to be supplied with a supply voltage VCC and to generate a second pump current, that is, the second current $I_{CP2}$; a first switch DN coupled between a node, that is, the second node N, and such first charge pump current generator 304 to receive the first binary signal $D_1$ from such first phase detector $PD_1$ and to switch in response to such first binary signal $D_1$ changing its logic level; a second switch UP coupled between such node N and such second charge pump current generator 306 to receive the second binary signal $D_2$ from such second phase detector $PD_2$ and to switch in response to such second binary signal $D_2$ changing its logic level; and a capacitor, that is, at least the second capacitor $C_2$, configured to be coupled between such node N and ground GND to be charged via the second pump current $I_{CP2}$ in response to the second switch UP being conductive and to be discharged via the first pump current $I_{CP1}$ in response to the first switch DN being conductive, wherein a charge voltage of such capacitor $C_2$, that is, the voltage that can be measured on such capacitor $C_2$ (applied thereon), provides (corresponds to) the feedback control signal $V_{CONTROL}$ for controlling the controlled current generator 200'.

Such first pump current $I_{CP1}$ generated by such first charge pump current generator 304 may be equal to such second pump current $I_{CP2}$ generated by such second charge pump current generator 306.

Figure 5:
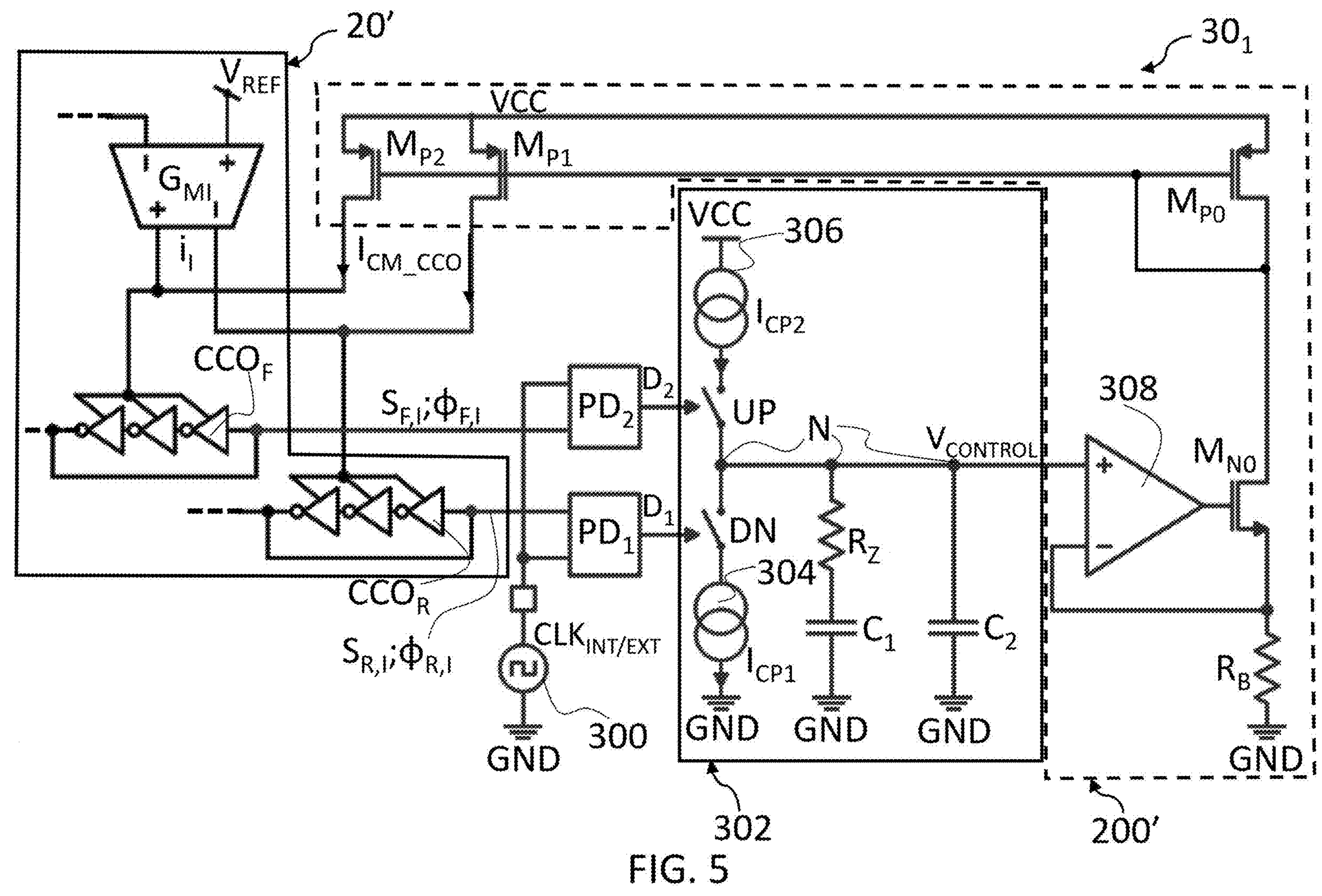

FIG. 5 is a time-based DC-DC converter $\mathbf{30}_1$ with a control loop comprising a circuit used to generate a PWM signal.

FIG. 5 illustrates a possible implementation of a controlled current generator 200' which is configured to provide the common-mode current of value $I_{CM\_CCO}$.

It is noted that the circuitry indicated with the reference 20' corresponds to the circuit of FIG. 3 except for the controlled current generator 200, therefore, a description of such circuitry 20' will not be repeated herein.

It is also noted that the circuitry comprised in the negative feedback loop (that is, the first phase detector $PD_1$ and the second phase detector $PD_2$, the up/down charge pump 302 and the components comprised therein, and, optionally, the reference clock generator 300) corresponds to that already described in FIG. 4, therefore, a description of such negative feedback loop will not be repeated herein.

The control signal $V_{CONTROL}$ generated by the up/down charge pump 302 as a function of the first PWM signal $D_1$ and the second PWM signal $D_2$ is provided to a voltage to current buffer (converter), comprising an amplifier stage 308, for instance, implemented through an operational amplifier, and a first transistor $M_{N0}$, for instance, any n-type transistor known in the art.

Therefore, the control signal $V_{CONTROL}$ is provided to a positive input terminal of an amplifier stage 308, which is further configured to have: its negative input terminal coupled to ground GND through a base resistor $R_B$ and to a source/emitter terminal of the first transistor $M_{N0}$, for instance, an n-type MOSFET or the like, and its output terminal coupled to a gate/base terminal of such first transistor $M_{N0}$, for instance, such n-type MOSFET or the like.

Thus, such voltage to current buffer may be configured to receive the control signal $V_{CONTROL}$, to amplify 308 such received control signal $V_{CONTROL}$, and to use such control signal $V_{CONTROL}$ to drive the gate/base terminal of the first transistor $M_{N0}$, such first transistor $M_{N0}$ being configured to let flow therein a mirror current of value equal to the common-mode current of value $I_{CM\_CCO}$, thus, converting the control signal $V_{CONTROL}$ into a current signal, that is, a mirror current signal with value equal to the common-mode current $I_{CM\_CCO}$, flowing between a drain/collector terminal and the source/emitter terminal of such first transistor $M_{N0}$.

Such first transistor $M_{N0}$ is further configured to be coupled with one or more current mirrors that are configured to receive such mirror current in a first branch (comprising a second transistor $M_{P0}$, for instance, any p-type transistor known in the art) and to generate the common-mode current of value $I_{CM\_CCO}$ for both the first current controlled oscillator $CCO_R$ and the second current controlled oscillator $CCO_F$ by reproducing such mirror current in at least a second branch (comprising a third transistor $M_{P1}$ and/or a fourth transistor $M_{P2}$, for instance, any p-type transistor known in the art).

It is noted that any other current mirror known in the art may be substituted to the one described herein, for instance, such current mirror may be implemented using BJTs ("Bipolar Junction Transistors") or MOSFETs, and may have any structure/components known in the art.

Therefore, such first transistor $M_{N0}$ is further configured to have its drain/collector terminal coupled to a drain/collector terminal of the second transistor $M_{P0}$, for instance, an p-type MOSFET or the like, and to a gate/base terminal of the same second transistor $M_{P0}$ since such second transistor $M_{P0}$ is configured to have its drain/collector terminal coupled to its gate/base terminal.

For instance, such second transistor $M_{P0}$ is further configured to have its source/emitter terminal coupled to a terminal supplied with a first supply voltage VCC and to have its gate/base terminal further coupled to respective gate/base terminals of the third transistor $M_{P1}$, for instance, a p-type MOSFET or the like, and the fourth transistor $M_{P2}$, for instance, an p-type MOSFET or the like.

For instance, such third transistor $M_{P1}$ and such fourth transistor $M_{P2}$ are further configured to have their respective source/emitter terminal coupled to such terminal supplied with a first supply voltage VCC and their respective drain/collector terminal coupled to the first current controlled oscillator $CCO_R$ and the second current controlled oscillator $CCO_F$, respectively.

Therefore, such third transistor $M_{P1}$ and such fourth transistor $M_{P2}$ are configured to provide the common-mode current of value $I_{CM\_CCO}$ to the first current controlled oscillator $CCO_R$ and the second current controlled oscillator $CCO_F$, respectively.

To summarize, DC-DC converters as described herein may comprise a controlled current generator 200' comprising: a voltage-to-current buffer, for instance, implemented through the previously described amplifier stage 308, first transistor $M_{N0}$, and base resistor $R_B$, configured to receive the feedback control signal $V_{CONTROL}$, apply a gain 308 to such feedback control signal $V_{CONTROL}$ and use such feedback control signal having a gain applied thereto to drive a transistor, for instance, such first transistor $M_{N0}$, configured to facilitate flow of a mirror current therein; and a current mirror, for instance, implemented through the second transistor $M_{P0}$, the third transistor $M_{P1}$, and (optionally) the fourth transistor $M_{P2}$, configured to receive such mirror current in a first mirror branch and to generate such controlled current, that is, the common-mode current of value $I_{CM\_CCO}$, by mirroring such mirror current in at least one second mirror branch.

Figure 6:
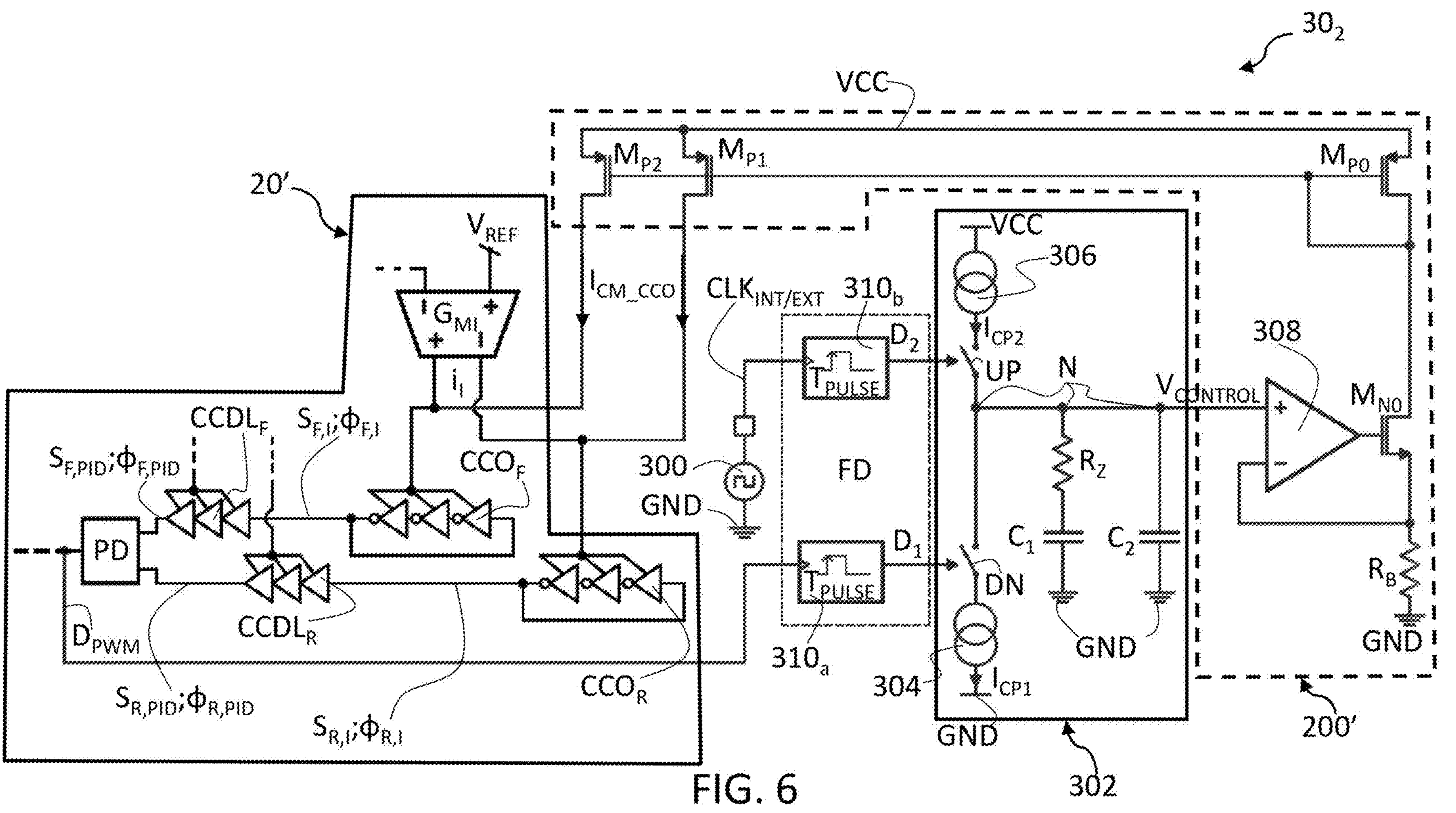
FIGS. 6, 7 and 8 are further time-based DC-DC converters with a control loop comprising a circuit used to generate a PWM signal.

FIG. 6 illustrates a further time-based DC-DC converter implementation comprising a control loop with a circuit used to generate a PWM signal.

Embodiments as that of FIG. 6 may be obtained by considering that the alignment of the switching activity of a time-based DC-DC converter with a reference clock signal may be obtained using any Frequency-Locked-Loop (FLL), for instance, any classical/standard FLL or any known FLL, in order to lock the switching activity of the time-based DC-DC converter to a given reference frequency, that is, the frequency of a reference clock signal, for instance, the reference clock signal $CLK_{INT/EXT}$ previously described.

It is noted that in embodiments as that of FIG. 6, the FLL may be configured to implement part of the previously described additional negative feedback loop.

It is noted that such FLL may be configured to act on the controlled current generator 200' that provides the common-mode current $I_{CM\_CCO}$ (already described, therefore, its description is not repeated herein), thus, an input signal for the FLL is to be identified in order to lock to a given reference frequency the switching activity of a time-based DC-DC converter comprising such FLL acting on the corresponding current controlled generator 200'.

Such an input signal for the FLL may be any digital signal carrying information about the switching activity of such time-based DC-DC converter, for instance, the PWM signal $D_{PWM}$ provided by the phase detector PD of FIG. 3 may be considered.

In fact, such PWM signal $D_{PWM}$ comprises information about the actual, that is, the instantaneous, switching frequency of the time-based DC-DC converter.

It is noted that time-based DC-DC converters are non-fixed frequency DC-DC converters, that is, their operating frequency may be fixed and defined only during steady-state conditions, while during any transient the switching frequency of both the current controlled oscillators, CCOs, may change (for instance, in order to facilitate overcoming the transients and maintaining output regulation), resulting in a change of the frequency of the switching activity of a corresponding DC-DC converter.

The magnitude of the variation of the frequency of the switching activity of the DC-DC converter may not be fixed/predictable since it may depend on the actual transient condition and on the negative feedback loop.

Locking an FLL to any digital signal carrying information about the switching activity of such time-based DC-DC converter during a transient (for instance, load transient, line transient, or the like) condition may result in the following operations: the time-based control loop of the time-based DC-DC converter may try to maintain an output regulation, and such FLL may try to maintain the switching frequency of the time-based DC-DC converter locked with the reference clock signal $CLK_{INT/EXT}$.

In fact, even the FLL may detect the transient condition of the DC-DC converter since the DC-DC converter switching frequency is experiencing such transient and such FLL is configured to receive a digital signal carrying information about such switching frequency.

Therefore, in time-based DC-DC converters comprising an FLL locked to a digital signal carrying information about the switching activity of such time-based DC-DC, the time-based control loop may interact with the FLL leading to stability issues.

To facilitate solving such stability issues, the FLL may be designed with a (much) smaller bandwidth than the time-based control loop of the time-based DC-DC converter. Thus, the FLL may be (much) slower than such time-based control loop.

In such a case, any transient of a time-based DC-DC converter may not be detected by the FLL since it is filtered out by the (much) faster time-based control loop of the DC-DC converter, that is, the time-based control loop of the DC-DC converter may resolve the transient condition restoring a steady-state condition prior of the FLL being capable of recognizing it.

It is noted that in solutions comprising an FLL locked to a digital signal carrying information about the switching activity of such time-based DC-DC converter, a (relatively deep) interaction between the FLL (comprised in the additional negative feedback loop) and the time-based control loop is present. Therefore, in order to reduce such an interaction and to increase the stability of the time-based DC-DC converter, the crossing frequency of the bandwidth of the time-based control loop has to be higher than the crossing frequency of the bandwidth of the FLL, for instance, of at least one order of magnitude.

It is noted that the performance of time-based DC-DC converters $30_2$ comprising FLLs locked to digital signals carrying information about the respective DC-DC switching activity may be affected by the chosen trade-off between the bandwidth of the FLL and DC-DC converter stability/transient performances.

FIG. 6 illustrates a possible implementation of a time-based DC-DC converter $30_2$ comprising an FLL locked to a digital signal carrying information about the switching activity of such time-based DC-DC converter $30_2$.

It is noted that the FLL as illustrated in FIG. 6 is reported by way of example only and it is not to be intended as a limitation for the scope of protection of the present document. In fact, as previously described, any other FLL implementation may be considered, for instance, any classical/standard FLL or any known FLL.

It is noted that the circuitry indicated in FIG. 6 with the reference 20' corresponds to the circuit of FIG. 3 except for the controlled current generator 200, therefore, a description of such circuitry 20' will not be repeated herein.

It is also noted that the circuitry of FIG. 6 comprised in the up/down charge pump 302 corresponds to that already described in FIG. 4, therefore, a description of such up/down charge pump 302 will not be repeated herein.

Similarly, it is noted that the circuitry of FIG. 6 comprised in the controlled current generator 200' corresponds to that already described in FIG. 5, therefore, a description of such controlled current generator 200' will not be repeated herein.

The time-based DC-DC converter $30_2$ as illustrated in FIG. 6 comprises an FLL comprising: a frequency detector FD, the up/down charge pump 302 (as previously described), the filtering stage (comprising the first capacitor $C_1$, the second capacitor $C_2$, and the filtering resistor $R_Z$ as previously described), and a CCO configured to be fed by the current provided by the common-mode current $I_{CM\_CCO}$ (as previously described).

A first frequency-detector constant pulse block $\mathbf{310}_a$ comprised in the frequency detector FD may be configured to receive the PWM signal $D_{PWM}$ provided by the phase detector PD of FIG. 3 and to generate a constant-width pulse, for instance, with a width equal to a time $T_{PULSE}$, in response to each rising edge of the received PWM signal $D_{PWM}$. Such constant-width pulses shaping the first PWM signal $D_1$ used to drive the first switch DN of the up/down charge pump 302.

The reference clock signal $CLK_{INT/EXT}$ (generated as described previously) is provided as input to a second frequency-detector constant pulse block $\mathbf{310}_b$ comprised in the frequency detector FD.

Such second frequency-detector constant pulse block $\mathbf{310}_b$ may be configured to receive the reference clock signal $CLK_{INT/EXT}$ and to generate a constant-width pulse, for instance, with a width equal to the time $T_{PULSE}$, in response to each rising edge of the received reference clock signal $CLK_{INT/EXT}$. Such constant-width pulses shaping the second PWM signal $D_2$ used to drive the second switch UP of the up/down charge pump 302.

It is noted that the constant-width pulses generated by the first frequency-detector constant pulse block $\mathbf{310}_a$ and the second frequency-detector constant pulse block $\mathbf{310}_b$ may be generated also in response to each falling edge of the received PWM signal $D_{PWM}$ and the received reference clock signal $CLK_{INT/EXT}$ respectively.

Hence, two constant-width signals are obtained from the first frequency-detector constant pulse block $\mathbf{310}_a$ and the second frequency-detector constant pulse block $\mathbf{310}_b$, that is, the first PWM signal $D_1$ and the second PWM signal $D_2$ respectively, based on the PWM signal $D_{PWM}$ and the reference clock signal $CLK_{INT/EXT}$ respectively.

It is noted that the first frequency-detector constant pulse block $\mathbf{310}_a$ and the second frequency-detector constant pulse block 310 may be configured to remove the duty-cycle dependance from the PWM signal $D_{PWM}$ and the reference clock signal $CLK_{INT/EXT}$ respectively (generating constant-width signals) in order to extract frequency information from such signals, obtaining such first PWM signal $D_1$ and such second PWM signal $D_2$ respectively, to drive the up/down charge pump 302 coupled thereto based on their frequency difference, that is, a frequency error, only.

The frequency detector FD may be configured to receive the PWM signal $D_{PWM}$ and the reference clock signal $CLK_{INT/EXT}$ and to generate, as previously described, the first PWM signal $D_1$ and the second PWM signal $D_2$, comprising frequency information about such received signals.

The up/down charge pump 302, may be configured to: receive the first PWM signal $D_1$ and the second PWM signal $D_2$, comprising frequency information about the PWM signal $D_{PWM}$ and the reference clock signal $CLK_{INT/EXT}$ respectively, and generate (as previously described) a frequency error signal, for instance, the control signal $V_{CONTROL}$, being a voltage signal indicating a frequency error between the frequency of the PWM signal $D_{PWM}$ and the frequency of the reference clock signal $CLK_{INT/EXT}$ based on such received first and second PWM signals $D_1$ and $D_2$.

It is noted that since the first and second PWM signals $D_1$ and $D_2$ driving the up/down charge pump 302 may depend on the frequency of the PWM signal $D_{PWM}$ and the frequency of the reference clock signal $CLK_{INT/EXT}$, the net charge moved in such up/down charge pump 302, that is, the charging/discharging of the first capacitor $C_1$ and second capacitor $C_2$, depends on the frequency difference, that is, the frequency error, between such PWM signal $D_{PWM}$ and such reference clock signal $CLK_{INT/EXT}$.

The frequency error signal, for instance, the control signal $V_{CONTROL}$, may be provided to the controlled current generator 200' (previously described) in order to drive such controlled current generator 200'.

The frequency detector FD, the up/down charge pump 302, the filtering stage, and the controlled current generator 200' may provide for an additional negative feedback loop configured to align the switching activity of the time-based DC-DC converter $30_2$ with the frequency of the reference clock signal $CLK_{INT/EXT}$.

Figure 7:
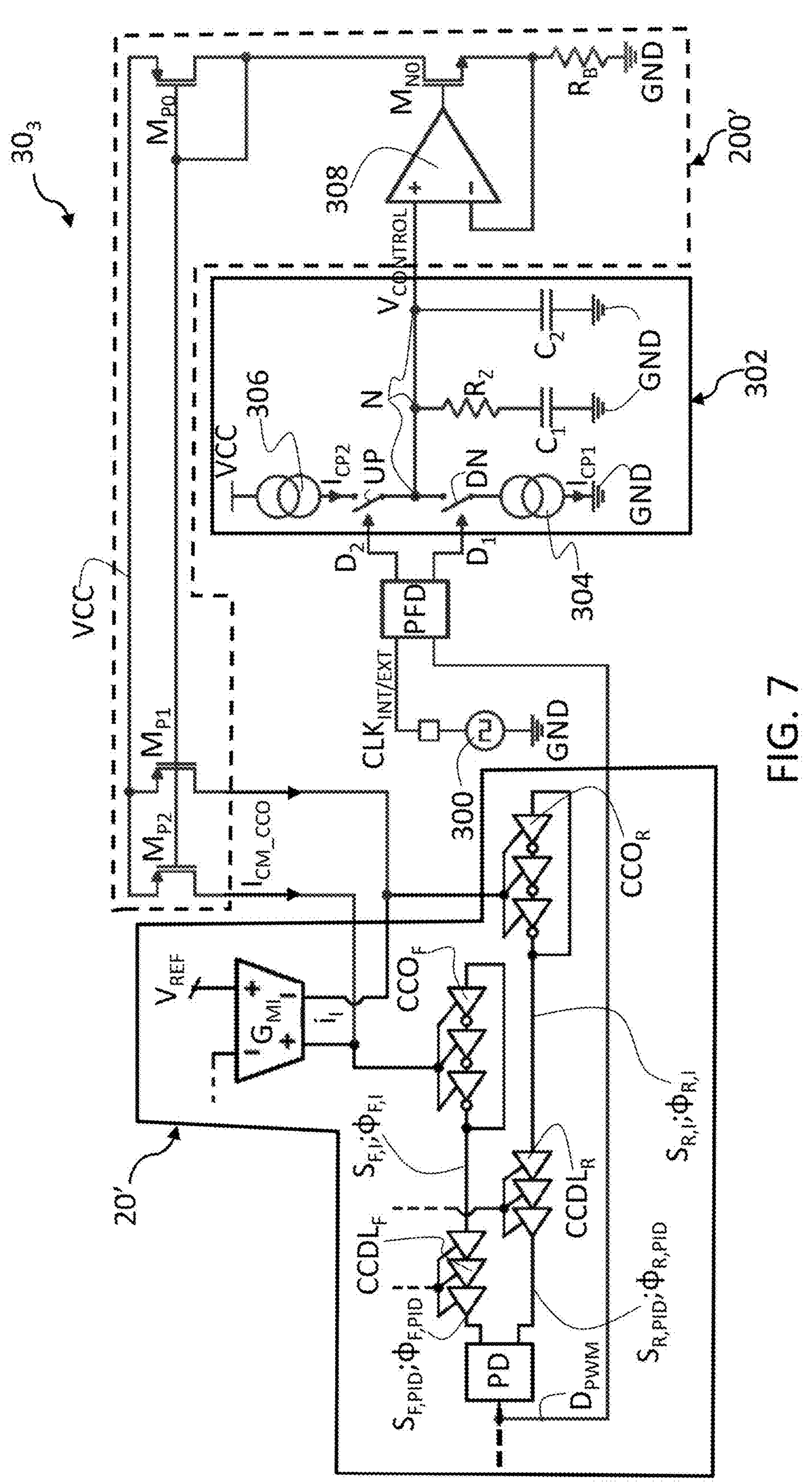

FIG. 7 illustrates a possible implementation of a time-based DC-DC converter $30_3$ comprising a Phase-Locked Loop, PLL instead of a FLL, such PLL being locked to a digital signal carrying information about the switching activity of such time-based DC-DC converter $30_3$.

Using a PLL instead of a FLL may facilitate obtaining a phase alignment, thus, in addition to the frequency alignment of the switching activity of the time-based DC-DC converter $30_3$ with the reference clock signal $CLK_{INT/EXT}$, even a phase alignment may be provided.

In fact, certain applications may benefit from the alignment of the DC-DC converter switching activity with a given edge of a reference signal, for instance, the rising or falling edge.

It is noted that having a phase locking may be more stringent than a frequency locking, in fact, using a phase locking may automatically provide for a frequency locking.

It is noted that the PLL as illustrated in FIG. 7 is reported by way of example only and it is not to be intended as a limitation for the scope of protection of the present document. In fact, any other PLL implementation may be considered, for instance, any classical/standard PLL or any known PLL.

It is noted that the circuitry indicated in FIG. 7 with the reference 20' corresponds to the circuit of FIG. 3 except for the controlled current generator 200, therefore, a description of such circuitry 20' will not be repeated herein.

It is also noted that the circuitry of FIG. 7 comprised in the up/down charge pump 302 and in the filtering stage corresponds to that already described in FIG. 4, therefore, a description of such up/down charge pump 302 will not be repeated herein.

Similarly, it is noted that the circuitry of FIG. 7 comprised in the controlled current generator 200' corresponds to that already described in FIG. 5, therefore, a description of such controlled current generator 200' will not be repeated herein.

The time-based DC-DC converter $\mathbf{30_3}$ as illustrated in FIG. 7 comprises a PLL comprising: a phase frequency detector PFD, for instance, any type of up/down phase frequency detector, the up/down charge pump 302 (as previously described), the filtering stage (comprising the first capacitor $C_1$, the second capacitor $C_2$, and the filtering resistor $R_Z$ as previously described), and a CCO configured to be fed by the current provided by the common-mode current $I_{CM\_CCO}$ (as previously described).

The phase frequency detector PFD, for instance, any type of up/down phase frequency detector, is configured to: receive the PWM signal $D_{PWM}$ and the reference clock signal $CLK_{INT/EXT}$, comprising phase and frequency information; generate the first PWM signal $D_1$ and the second PWM signal $D_2$, comprising phase and frequency information about such received signals, removing the duty-cycle dependance; and provide such generated signals to the up/down charge pump 302 coupled thereto.

Therefore, solutions comprising time-based DC-DC converters $\mathbf{30_3}$ as described in FIG. 7, may advantageously facilitate aligning the phase of the switching activity of time-based DC-DC converters $\mathbf{30_3}$ with reference signals in addition to facilitating aligning the switching frequency of the switching activity of time-based DC-DC converters $\mathbf{30_3}$ with such reference signals.

It is noted that the performance of time-based DC-DC converters $\mathbf{30_3}$ comprising PLLs locked to digital signals carrying information about the respective DC-DC switching activity may be affected by the chosen trade-off between the bandwidth of the PLL and DC-DC converter stability/transient performances.

FIG. 8 illustrates again a time-based DC-DC converter implementation comprising a control loop with a circuit used to generate a PWM signal.

Figure 8:
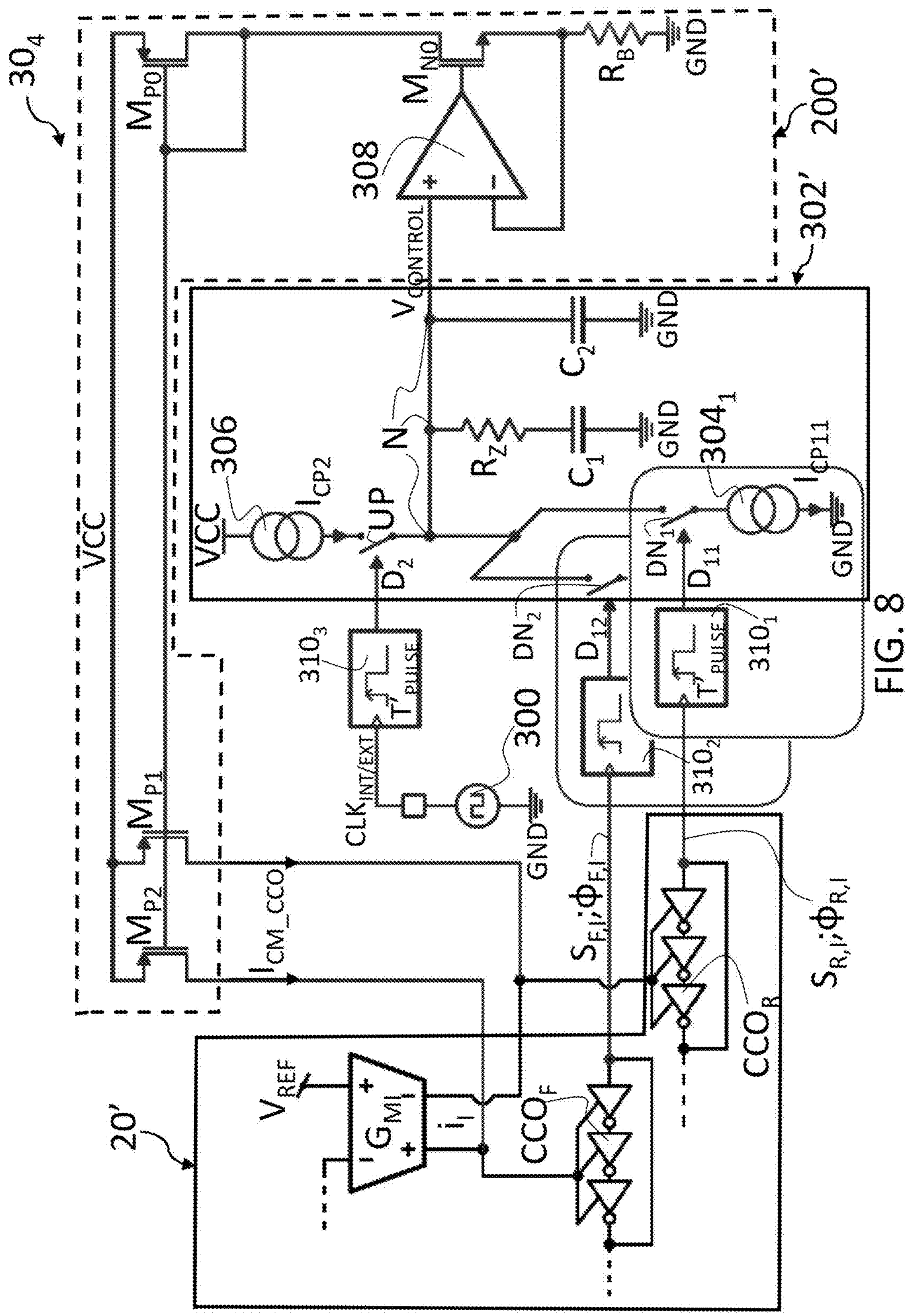

Embodiments as that of FIG. 8 are obtained by considering (as previously described) that during any transient condition the time-based control loop of the DC-DC converter may react by changing the frequencies of the current controlled oscillators CCOs in opposite directions, that is, in a complementary way, thus, operating in a differential-mode.

Therefore, as described previously, an additional negative feedback loop configured to control the switching frequency of the DC-DC converter in steady-state conditions, limiting the interference with the time-based control loop of the DC-DC converter (in order to facilitate—as previously described—avoiding performance degradations and improving the stability of both the time-based control loop and the additional negative feedback loop) may be considered.

A possible solution for limiting such interference may be obtained by considering a signal carrying information about the steady-state frequency of the switching activity of the DC-DC converter, such signal being not affected by any operation of the time-based control loop.

The first input signal $S_{R,I}$ provided by the first current controlled oscillator $CCO_R$ and the second input signal $S_{F,I}$ provided by the second current controlled oscillator $CCO_F$ may not be affected neither by the proportional action nor by the derivative action of the time-based control loop, but may still be affected by the integral action of such time-based control loop, therefore, such first input signal $S_{R,I}$ and such second input signal $S_{F,I}$ may not be used individually.

In addition, monitoring the frequency of a single signal within the time-based control loop may be misleading since it may not represent faithfully the actual frequency of the switching activity of the DC-DC converter, for instance, during any transient response of the DC-DC converter.

Hence, as the common-mode frequency of the first input signal $S_{R,I}$ and the second input signal $S_{F,I}$, that is, the common-mode frequency of the current controlled oscillators CCOs, may provide information about the instantaneous frequency value of the switching activity of the considered DC-DC converter (by averaging the values of the instantaneous frequencies of the first input signal $S_{R,I}$ and the second input signal $S_{F,I}$), an additional negative feedback loop sensitive to such common-mode frequency of the first input signal $S_{R,I}$ and the second input signal $S_{F,I}$ may be considered.

FIG. 8 illustrates a possible implementation of a time-based DC-DC converter 304 comprising an additional negative feedback loop sensitive to the common-mode frequency of the current controlled oscillators CCOs.

It is noted that the circuitry indicated in FIG. 8 with the reference 20' corresponds to the circuit of FIG. 3 except for the controlled current generator 200, therefore, a description of such circuitry 20' will not be repeated herein.

Similarly, it is noted that the circuitry of FIG. 8 comprised in the controlled current generator 200' corresponds to that already described in FIG. 5, therefore, a description of such controlled current generator 200' will not be repeated herein.

It is also noted that part of the circuitry of FIG. 8 comprised in a three-inputs up/down charge pump 302' corresponds to that of the up/down charge pump 302 already described in FIG. 4, therefore, a description of such circuitry of the three-inputs up/down charge pump 302' will not be repeated herein, for instance, a description of the second current generator 306, the second current $I_{CP2}$, the second switch UP, the second node N.

Similarly, it is noted that a description of the filtering stage will not be repeated as it corresponds to the filtering stage already described in FIG. 4, therefore a description of the filtering resistor $R_Z$, the first capacitor $C_1$, the second capacitor $C_2$, and the control signal $V_{CONTROL}$ will not be repeated herein.

The time-based DC-DC converter 304 as illustrated in FIG. 8 may comprise the three-inputs up/down charge pump 302', the filtering stage (as previously described), a first constant pulse block 310$_1$, a second constant pulse block 310$_2$, and a third constant pulse block 310$_3$.

The up/down three-inputs charge pump 302' may be configured to be controlled by constant-width signals (shaped by constant-width pulses), such constant-width signals being received from the first constant pulse block 310$_1$, the second constant pulse block 310$_2$, and the third constant pulse block 310$_3$.

The third constant pulse block 310$_3$ may be configured to receive the reference clock signal $CLK_{INT/EXT}$ and to generate a constant-width pulse, for instance, with a width equal to a time $T'_{PULSE}$, in response to each rising edge of the received reference clock signal $CLK_{INT/EXT}$. Such constant-width pulses shaping the second PWM signal $D_2$ used to drive the second switch UP comprised in the three-inputs up/down charge pump 302'.

It is noted that even in this case the constant-width pulses generated by the third constant pulse block 310$_3$ may be generated also in response to each falling edge of the received reference clock signal $CLK_{INT/EXT}$.

It is noted that such third constant pulse block 310$_3$ may be configured to remove the duty-cycle dependance from the reference clock signal $CLK_{INT/EXT}$ (generating a constant-width signal) in order to extract frequency information from such reference signal, obtaining the second PWM signal $D_2$ for driving the three-inputs up/down charge pump 302' coupled thereto.

The lower part of the up/down three-inputs charge pump 302' can be split, for instance, in two branches, each of such branches comprising a respective current generator configured to generate a respective current and a respective switch.

For instance, a first branch may comprise a first branch current generator 304$_1$ configured to generate a respective first branch current $I_{CP11}$ and a first branch switch $DN_1$, and a second branch may comprise a second branch current generator 304$_2$ (not shown in FIG. 8) configured to generate a respective second branch current $I_{CP12}$ (not shown in FIG. 8) and a second branch switch $DN_2$.

The first branch and the second branch may be matched, that is, identical, for instance, the first branch current $I_{CP11}$ may be equal to the second branch current $I_{CP12}$, resulting in a first branch current generator 304$_1$ and a second branch current generator 304$_2$ configured to sink half of the current generated by the second current generator 306.

The first branch of the lower part of the up/down three-inputs charge pump 302' may be configured to receive a constant-width signal, that is, a first branch PWM signal $D_{11}$, from the first constant pulse block 310$_1$, such first branch PWM signal $D_{11}$ indicating to such first branch switch $DN_1$ to open or close, for instance, to close in response to the first branch PWM signal $D_{11}$ being set to a high logic level and to open in response to such first branch PWM signal $D_{11}$ being set to a low logic level.

The first constant pulse block 310$_1$ may be configured to receive the first input signal $S_{R,I}$ from the first current controlled oscillator $CCO_R$ and to generate a constant-width pulse, for instance, with a width equal to a time $T'_{PULSE}$, in response to each rising edge of the received first input signal $S_{R,I}$. Such constant-width pulses shaping the first branch PWM signal $D_{11}$ used to drive the first branch switch $DN_1$ comprised in the three-inputs up/down charge pump 302'.

It is noted that the constant-width pulses generated by the first constant pulse block 310$_1$ may be generated also in response to each falling edge of the received first input signal $S_{R,I}$, and that such first constant pulse block 310$_1$ may be configured to remove the duty-cycle dependance from the first input signal $S_{R,I}$ (generating a constant-width signal) in order to extract frequency information from such signal, obtaining the first branch PWM signal $D_{11}$ for driving the three-inputs up/down charge pump 302' coupled thereto.

The second branch of the lower part of the up/down three-inputs charge pump 302' may be configured to receive a constant-width signal, that is, a second branch PWM signal $D_{12}$, from the second constant pulse block 310$_2$, such second branch PWM signal $D_{12}$ indicating to such second branch switch $DN_2$ to open or close, for instance, to close in response to the second branch PWM signal $D_{12}$ being set to a high logic level and to open in response to such second branch PWM signal $D_{12}$ being set to a low logic level.

The second constant pulse block 310$_2$ may be configured to receive the second input signal $S_{F,I}$ from the second current controlled oscillator $CCO_F$ and to generate a constant-width pulse, for instance, with a width equal to a time $T'_{PULSE}$, in response to each rising edge of the received second input signal $S_{F,I}$. Such constant-width pulses shaping the second branch PWM signal $D_{12}$ used to drive the second branch switch $DN_2$ comprised in the three-inputs up/down charge pump 302'.

It is noted that the constant-width pulses generated by the second constant pulse block 310$_2$ may be generated also in response to each falling edge of the received second input signal $S_{F,I}$, and that such second constant pulse block 310$_2$ may be configured to remove the duty-cycle dependance from the second input signal $S_{F,I}$ (generating a constant-width signal) in order to extract frequency information from such signal, obtaining the second branch PWM signal $D_{12}$ for driving the three-inputs up/down charge pump 302' coupled thereto.

In this way, the charge sourced on the first and second capacitors $C_1$ and $C_2$ of the filtering stage by the up/down three-inputs charge pump 302' may be proportional to the frequency of the reference clock signal $CLK_{INT/EXT}$, and the charge sunk from such first and second capacitors $C_1$ and $C_2$ may be proportional to the common-mode frequency of the first input signal $S_{R,I}$ and the second input signal $S_{F,I}$, that is, the common-mode frequency of the current controlled oscillators CCOs.

The charge sourced on/sunk from the first and second capacitor $C_1$ and $C_2$ may be substantially stable irrespective of the operating conditions of the DC-DC converter, in fact, both in steady-state conditions and during transients (that is, irrespective of the operative conditions) the values of the frequency of the reference clock signal $CLK_{INT/EXT}$ and of the common-mode frequency of the current controlled oscillators CCOs may remain substantially stable (considering a given tolerance).

In fact, in steady-state conditions the current controlled oscillators CCOs are configured to have a same frequency, while during transient conditions the frequency of one of the current controlled oscillators increases of a given amount and the frequency of the other of the current controlled oscillators decreases of the same given amount, thus, maintaining their average frequency substantially stable (considering a given tolerance) irrespective of the operative conditions, resulting in a substantially stable value of the common-mode frequency of such current controlled oscillators CCOs.

Time-based DC-DC converters 304 as described in FIG. 8 may provide an alignment of the average frequency of the current controlled oscillators CCOs, that is, the common-mode frequency of the current controlled oscillators CCOs, with the frequency of the reference clock signal $CLK_{INT/EXT}$.

It is noted that the structure of a time-based DC-DC converter 30$_4$ that may be configured to align such common-mode frequency of the current controlled oscillators CCOs with the frequency of the reference clock signal $CLK_{INT/EXT}$ may be also implemented differently, thus, the structure of DC-DC converters illustrated in FIG. 8 is provided herein by way of example and is not to be intended as a limitation of the scope of protection of the present document.

For example, a same result may be obtained if the first branch current generator $304_1$ configured to generate the respective first branch current $I_{CP11}$ and the second branch current generator $304_2$ configured to generate the respective second branch current $IC_{P12}$ are configured to provide the respective currents for a halved duration with respect to the second current generator 306 configured to generate the second current $I_{CP2}$.

In such a case, the first branch current $I_{CP11}$, the second branch current $I_{CP12}$, and the second current $I_{CP2}$ may have an equal value, thus, the first branch current generator $304_1$, the second branch current generator $304_2$, and the second current generator 306 may be sized in order to carry an equal amount of current.

For example, a same result may also be obtained if the frequencies of the signals generated by the current controlled oscillators CCOs, that is, the first input signal $S_{R,I}$ and the second input signal $S_{F,I}$, are divided by a factor equal to two before feeding the respective first or second constant pulse block $310_1$ or $310_2$, for instance, performing such division using a flip-flop.

It is noted that even in this case the first branch current $I_{CP11}$, the second branch current $I_{CP12}$, and the second current $I_{CP2}$ may have an equal value, and thus, the first branch current generator $304_1$, the second branch current generator $304_2$, and the second current generator 306 may be sized in order to carry an equal amount of current.

For example, a same result may also be obtained if the reference clock signal $CLK_{INT/EXT}$ is provided at double the frequency to which the frequency of the switching activity of the DC-DC converter is to be locked.

In such a case, the frequency of the reference clock signal $CLK_{INT/EXT}$ may be divided by a factor equal to two, for instance, performing such division using a flip-flop, and such divided reference clock signal $CLK_{INT/EXT}$ can be coupled to the three-inputs up/down charge pump 302' with or without such third constant pulse block $310_3$.

It is noted that if such divided reference clock signal $CLK_{INT/EXT}$ is coupled to the three-inputs up/down charge pump 302' without such third constant pulse block $310_3$, the first input signal $S_{R,I}$ and the second input signal $S_{F,I}$ (generated by the current controlled oscillators CCOs) are to be divided by a factor of two and coupled to the three-inputs up/down charge pump 302' without the first constant pulse block $310_1$ and the second constant pulse block $310_2$.

If the divided reference clock signal $CLK_{INT/EXT}$ is coupled to the three-inputs up/down charge pump 302' without such third constant pulse block $310_3$, such divided reference clock signal $CLK_{INT/EXT}$ may correspond to the second PWM signal $D_2$.

It is noted that such third constant pulse block $310_3$ may not be required since the operation of dividing a digital signal by a factor equal to two using a flip-flop may already provide a constant-width signal, that is, a signal with a constant duty-cycle, for instance, a duty-cycle equal to 50%, thus, removing the duty-cycle dependency without the operations of the third constant pulse block $310_3$.

It is noted that the constant pulse blocks of FIGS. 6 and 8, collectively referred to as 310, may be implemented in different ways (depending on the selected pulse duration), for instance, in any known way, such as: an inverter chain and combinatorial logic or latches; or an analog timer, for instance, an inverter or an I/C with a hard-squarer comparator, that is, a known circuit comprising a controlled current generator I coupled to a capacitor C and to a non-inverting terminal of a hard-squarer comparator whose inverting terminal is coupled to an input voltage.

It is noted that the duration (that is, the width) of the constant-width pulses generated by the constant pulse blocks 310, that is, the time $T_{PULSE}$ or $T'_{PULSE}$, may have: a lower limit value given by the non-linearities and non-idealities of the up/down charge pump 302 or the three-inputs up/down charge pump 302'; and an upper limit value given by the maximum operating frequency.

It is noted that by using embodiments as that of FIGS. 4 to 8 it is possible to facilitate controlling, for instance, by changing the frequency of the switching activity of a corresponding time-based DC-DC converter, such switching activity without impacting the regulation of such DC-DC converter.

Therefore, embodiments as that of FIGS. 4 to 8 may facilitate increasing the performance of time-based DC-DC converters, for instance, as the frequency of the switching activity of a time-based DC-DC converter may be adapted depending on the application by aligning it with a provided internal or external clock signal.

It is noted that time-based DC-DC converters 30, $30_1$, and $30_4$ are characterized by high symmetries, therefore, for instance, the signals generated by the first current controlled oscillator $CCO_R$ and the second current controlled oscillator $CCO_F$ feeding the first phase detector $PD_1$ and the second phase detector $PD_2$ respectively may be swapped without problems in operating such time-based DC-DC converters 30, $30_1$, and $30_4$.

In fact, in a steady-state condition such signals generated by the first current controlled oscillator $CCO_R$ and the second current controlled oscillator $CCO_F$ may have a same frequency value.

It is noted that the controlled current generator 200' configured to provide such common-mode current of value $I_{CM\_CCO}$ may be implemented with a voltage to current buffer, for instance, the voltage to current buffer of FIG. 5 (reported therein by way of a non-limitative example), any voltage to current buffer using an operational amplifier, any voltage to current buffer using a simple common drain stage, or any other known voltage to current buffer configuration.

It is noted that the first input signal $S_{R,I}$ and the second input signal $S_{F,I}$ may be processed, for instance, squared or with any other type of processing, before being fed to the first phase detector $PD_1$ and the second phase detector $PD_2$ (in embodiments according to FIGS. 4, 5, and 8).

It is noted that mismatches affecting the up/down charge pump 302, for instance, the first and second currents $I_{CP1}$ and $IC_{P2}$, and/or the first phase detector $PD_1$ and the second phase detector $PD_2$ may impact only respective periods of the first PWM signal $D_1$ and the second PWM signal $D_2$, leaving substantially unaffected the average value of the control signal $V_{CONTROL}$ (it is noted that such an advantage may not be present in time-based DC-DC converters $30_4$ as described in FIG. 8, therefore, parts of the following description that refers to such an advantage are not to be considered as related to architectures of time-based DC-DC converters according to FIG. 8).

Therefore, the design of the added negative feedback loop is not critical, that is, not sensitive to mismatches (except for embodiments of time-based DC-DC converters $30_4$ according to FIG. 8), PVT variations, and changes in the operating conditions.

For instance, considered mismatches to which such added negative feedback loop is not sensitive may be: the presence of a first current $I_{CP1}$ different from the second current $I_{CP2}$; the presence of a first phase detector $PD_1$ different from the second phase detector $PD_2$, for instance, having different propagation delays; the presence of an offset in the amplifier stage 308; the presence of mismatches between the second transistor $M_{P0}$ and the third transistor $M_{P1}$/the fourth transistor $M_{P2}$; and the presence of mismatches between the third transistor $M_{P1}$ and the fourth transistor $M_{P2}$.

The first four mismatches (that described in the first four points of the previous list) may be compensated by such added negative feedback loop since it is configured to act as an integrator.

In fact, in a steady-state condition, the control signal $V_{CONTROL}$ is set to a certain value, for instance, $V_{CONTROL}$*, such certain value $V_{CONTROL}$* being the value that facilitate biasing the current controlled oscillators CCOs through a common-mode current of value $I_{CM\_CCO}$ in order to obtain a frequency of the signal generated by such current controlled oscillators CCOs that is equal to that of the reference clock signal $CLK_{INT/EXT}$.

Therefore, in a steady-state condition, such certain value $V_{CONTROL}$* may be maintained to a same value since the amount of charge subtracted from such first and second capacitors $C_1$ and $C_2$ by the first current $I_{CP1}$ flowing within the first switch DN in one switching cycle is equal to the amount of charge injected into such first and second capacitors $C_1$ and $C_2$ by the second current $I_{CP2}$ flowing within the second switch UP in the same switching cycle, otherwise, such certain value $V_{CONTROL}$* may be affected by transients (and would not be in a steady-state condition).

Hence, the mismatches of the first four points described in the above list may be absorbed by the integral action performed by the added negative feedback loop, for instance, by the up/down charge pump 302.

It is noted that such integral action performed by the up/down charge pump 302 may be further enhanced by the added filtering stage comprising the first capacitor $C_1$, the second capacitor $C_2$, and the filtering resistor $R_Z$.

The mismatches between the third transistor $M_{P1}$ and the fourth transistor $M_{P2}$ may lead to differential errors that may affect the switching frequency of the DC-DC converter, leading to different switching frequencies of the first input signal $S_{R,I}$ and the second input signal $S_{F,I}$ (such mismatches being absorbed by the time-based control loop of the DC-DC converter).

Therefore, advantageously, such mismatches between the third transistor $M_{P1}$ and the fourth transistor $M_{P2}$ may not even influence the added negative feedback loop as it is sensitive only to the common-mode of such frequencies, that is, the common-mode frequency of the first input signal $S_{R,I}$ and the second input signal $S_{F,I}$.

It is noted that the behavior of time-based DC-DC converters 30, 30$_1$, 30$_2$, 30$_3$, and 30$_4$ is not related to the duty-cycle, that is, the percentage of a waveform period wherein the waveform is set at a high logic level, of the reference clock signal $CLK_{INT/EXT}$ (or the reference binary signal), therefore, any reference clock signal $CLK_{INT/EXT}$ (or any reference binary signal) may be considered, allowing high flexibility.

Embodiments as that of FIGS. 4 to 8 may advantageously facilitate: the monitoring of the frequency of the switching activity of a time-based DC-DC converter since the frequency of a current reference clock signal $CLK_{INT/EXT}$ to which the switching activity is synchronized may be known; the obtaining of a specific control variable, that is, the control signal $V_{CONTROL}$, used to align the frequency of the switching activity of a time-based DC-DC converter to the frequency of a selected (either internal or external, and with any frequency) reference clock signal $CLK_{INT/EXT}$ or any other selected binary signal, facilitating the use of such time-based DC-DC converter in various application with different requirements; the controlling and monitoring of the switching activity frequency limiting or removing impacts on the stability, phase margin, or performance during dynamic/transient operations since a separation between the time-based control loop and the negative feedback loop is provided, that is, the negative feedback loop does not affect the operations of the time-based control loop as they are decoupled; the maintaining of a high flexibility in designing both the time-based DC-DC converter and a corresponding time-based control loop and the negative feedback loop as they may be designed and/or optimized separately (that is, irrespective of the other loop) since the time-based control loop and the negative feedback loop are separated/decoupled (the only shared element is the gain of the current controlled oscillators CCOs), facilitating the use of such negative feedback loop even with differently implemented time-based DC-DC converters and/or differently implemented time-based control loops; and the use of time-based DC-DC converters limiting or removing additional trimming of the components comprised in the added negative feedback loop (except for embodiments of time-based DC-DC converters 30$_4$ according to FIG. 8), with a minimal added current consumption that may not have impacts on the efficiency/quiescent consumption of the time-based DC-DC converter.

Regarding the previous point, it is noted that embodiments according to FIGS. 7 and 8 may start to have relevant current consumption, complexity, and silicon area occupied, while embodiments according to FIGS. 4 to 6 may advantageously have a minimal added current consumption, complexity, and silicon area. For instance, embodiments according to FIGS. 4 and 5 may comprise a pair of phase detectors $PD_1$ and $PD_2$ that may be implemented with digital blocks that may not consume quiescent current and that may not be area demanding and wherein the matching may not be critical.

Possible applications of solutions described herein are, as already described, applications wherein an alignment of the switching activity of a time-based DC-DC converter with a given reference signal, either internally or externally provided, may be beneficial, for instance, non-exhaustive examples of such applications may be: Power Management ICs (PMIC) for Active Matrix Organic Light Emitting Diode (AMOLED) power supplies containing time-based buck/boost/buck-boost DC-DC converters; time-based buck DC-DC converters embedded in SoCs and configured to supply microprocessor and/or microcontroller cores; or time-based buck DC-DC converters used for industrial and/or automotive applications.

It is noted that the negative feedback loop as illustrated in FIGS. 4 to 8 is described with reference to the time-based DC-DC converter topology illustrated in FIG. 3 but such negative feedback loop may be implemented also with any other known topology of time-based DC-DC converter by coupling the first phase detector $PD_1$ and the second phase detector $PD_2$ to signals corresponding to the first input signal $S_{R,I}$ and the second input signal $S_{F,I}$, that is, signals having a similar use.

To further monitor the switching activity of a time-based DC-DC converter, an additional current sensor optimized for DC-DC converters may be integrated within embodiments of solutions described herein.

It is noted that even if such additional current sensor is described herein as integrated within a time-based DC-DC converter structure as that illustrated in FIGS. 4 to 8 such additional current sensor may advantageously be used also for other types of DC-DC converters, that is, not only with inductive-based hard-switched converters but also with resonant, hybrid, multi-level, AC-DC converters, or the like, as it is configured to be coupled with a low side switch of an half-bridge which may be present in many types and configurations of DC-DC converters.

Therefore, embodiments of time-based DC-DC converters as described herein may advantageously be further controlled and monitored using an additional current sensor, for instance, by monitoring the actual value of a current flowing within a coil of a DC-DC converter and using such information to control the switching activity of such DC-DC converter (for instance, varying the frequency of the reference signal to which the switching activity is aligned).

In addition, such additional current sensor may be used to improve safety and/or stability of DC-DC converters comprising an added negative feedback loop as described herein, for instance, by providing a negative coil current protection feature that facilitate limiting the minimum coil current, that is, the current flowing within the coil of a DC-DC converter, to given negative values.

It is noted that, advantageously, settings related to provided safety and/or stability features, for instance, settings related to such negative coil current protection feature, may be tuned/varied in relation to the frequency of the switching activity of a considered DC-DC converter, wherein such frequency of the switching activity may be configured to be changed by the added negative feedback loop described herein as a function of a reference clock signal. Reference is also made to the following related art (all of which is incorporated by reference): Lam, et al., "Loop gain analysis and development of high-speed high-accuracy current sensors for switching converters," in Proc. IEEE Symp. Circuits and Systems, pp. 828-831, May 2004; and Wicht, "Power Stages, Gate Drivers and Protection", MEAD Education, November 24 and 26, December 01 and 03, 2020, Institute of Microelectronic Systems, Leibniz Universität Hannover, Germany.

It may be noted that if the low side switch LS of the half-bridge (refer to FIG. 3 for the description of such low side switch LS and the corresponding half-bridge LS, HS) of a time-based DC-DC converter, for instance, DC-DC converters 30, 30$_1$, 30$_2$, 30$_3$, or 30$_4$ is closed, a first node LX (refer to FIG. 3 or 6), that is, the node between such low side switch LS (for instance, implemented by a low-side power MOSFET $MN_{POWERFET}$) and the inductor L, corresponds to a low impedance source carrying information of a coil current $I_L$ flowing within such inductor L, in fact:

$$V_{LX}(t) = -I_L(t)R^{ON}_{POWERFET}$$

wherein $V_{LX}(t)$ is the voltage measured at the first node LX at the time t, $I_L(t)$ is the coil current $I_L$ flowing within the inductor L at the same time t, and $$R^{ON}_{POWERFET}$$

is the value of the on-resistance, that is, the resistance value between the drain terminal and the source terminal of a MOSFET during operation, that is, when such MOSFET is closed, of the low-side power MOSFET $MN_{POWERFET}$.

In addition, it may be noted that a DC-shifted, that is, subject to a voltage shift of a given DC value (which may also be fixed), low input impedance node $N_1$ may be considered to retrieve information on the coil current $I_L$ flowing within the inductor L (for instance, when such coil current $I_L$ assumes both positive and negative values) using a voltage-to-current conversion leveraged by the low impedance of the first node LX.

For instance, such DC-shifted low input impedance node $N_1$ may be obtained using a high-gain sensor negative feedback loop (referred to as 40 in FIG. 9), for instance, implemented using an operational amplifier 400, that may be configured to act on the gate of an output transistor (referred to as $M_{N3}$ in FIG. 9), thus, creating a DC-shifted (and fixed) low impedance node $N_1$ on the source terminal of such transistor.

Figure 9:
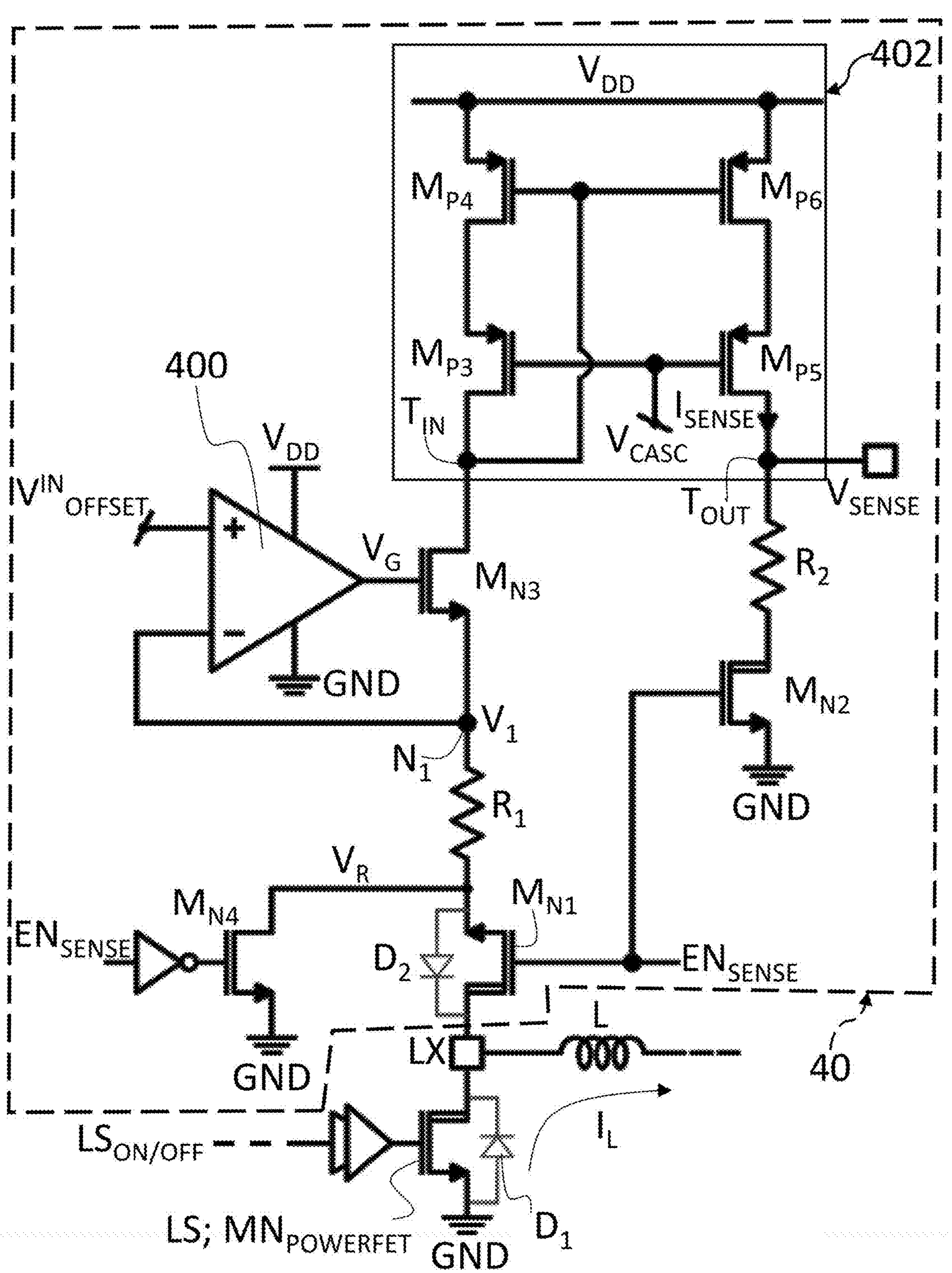
FIG. 9 and FIG. 10 are low-side current sensors for DC-DC converters.

If the low-side power MOSFET $MN_{POWERFET}$ is closed, that is, in a conductive state, coupling the aforementioned source terminal of the transistor, that is, the low impedance node $N_1$, to such low-side power MOSFET $MN_{POWERFET}$, for instance, through a first resistor (referred to as $R_1$ in FIG. 9), may convert the voltage drop on the low-side power MOSFET $MN_{POWERFET}$ in a corresponding coil current information, such coil current information being amplified by an amplification stage, for instance, a sensor current mirror (referred to as 402 in FIG. 9) with an amplification factor equal to M, and sourced on a second matched resistor (referred to as $R_2$ in FIG. 9.

Therefore, a left branch of such additional current sensor is configured to retrieve information on the coil current $I_L$ and then a desired magnification operation may be performed, for instance, using a sensor current mirror with an amplification factor equal to M, for instance, comprising MOSFETs of p-channel type, configured to provide an output current (referred to as ISENSE in FIG. 9) on such second matched resistor.

FIG. 9 is a low-side current sensor 40 for DC-DC converters, for instance, for the time-based DC-DC converters 30, 30$_1$, 30$_2$, 30$_3$, and 30$_4$ of FIGS. 4 to 8 respectively.

The low-side current sensor 40 described herein facilitate controlling and monitoring time-based DC-DC converters as that illustrated in FIGS. 4 to 8 as it is configured to: monitor the amount of current flowing within the low side switch LS of the half-bridge (that is, the current flowing within the coil of a respective DC-DC converter, namely, the coil current $I_L$) even during transient, therefore, being characterized by a fast transient response; monitor the coil current $I_L$ also in DC-DC converters with switching activities at high frequencies, such feature being particularly advantageous for DC-DC converters as that described herein as the frequency of the switching activity may be set to any possible value by changing the reference clock signal $CLK_{INT/EXT}$; and limit or remove the effects of PVT variations and different DC-DC converters operative conditions, such feature being again advantageous for DC-DC converters as that described herein as they may operate in different conditions (steady-state, transient both complementary and non-complementary) as described above.

Thus, such low-side current sensor 40 may be advantageously used in DC-DC converters with a structure as that described herein, facilitating obtaining more stable and safer loops, that is, time-based control loops and/or negative feedback loops.

Therefore, it can be noted that a low-side current sensor 40 coupled with a DC-DC converter as that described in FIGS. 4 to 8 may facilitate controlling (for instance, interrupting anomalous operative conditions by enabling protections, for instance, in response to anomalous current measurements) and monitoring (for instance, by storing and/or analyzing a behavior of data collected by such current sensor) of the switching activity of such DC-DC converter, leading to possible increases in its performance.

As previously described, such low-side current sensor 40 is configured: to be coupled with the low side switch LS, for instance, implemented using a low-side power MOSFET $MN_{POWERFET}$, of the half-bridge (illustrated in FIG. 3); and to sense a current flowing within such low side switch LS, that is, such low-side power MOSFET $MN_{POWERFET}$, such current flowing within such low side switch LS being the current flowing within the coil (namely, a coil current $I_L$) of a corresponding DC-DC converter (that is, either a buck or a boost DC-DC converter), for instance, the inductor L.

In this way, information about the instantaneous value of such coil current $I_L$ may be obtained, such information being used in time-based control loops and/or negative feedback loops, for instance, for protection purposes as described above.

It is noted that the low-side power MOSFET $MN_{POWERFET}$ may be configured to be opened or closed in response to a low side switch signal $LS_{ON/OFF}$ received at its gate terminal indicating to open or close the low side switch of the half-bridge, respectively.

Such low-side power MOSFET $MN_{POWERFET}$, for instance, an n-type power MOSFET, may have a first diode $D_1$ coupled between its source terminal and its drain terminal to be protected from reverse flowing currents, wherein such first diode $D_1$ may be already present in the body well of such low-side power MOSFET $MN_{POWERFET}$.

Such low-side current sensor 40 is coupled to such low-side power MOSFET $MN_{POWERFET}$ through a fifth transistor, for instance, a power MOSFET $M_{N1}$, for instance, an n-type MOSFET, which is configured to implement a switch used to decouple such low-side current sensor 40 from such low-side power MOSFET $MN_{POWERFET}$.

Such fifth transistor $M_{N1}$, that is, the power MOSFET $M_{N1}$, is further configured to be closed following (after) the low-side power MOSFET $MN_{POWERFET}$ closes, and to be opened prior (before) to the opening of such low-side power MOSFET $MN_{POWERFET}$, acting as a safety/protection switch that facilitates the compliance with High-Voltage switching activities of High-Voltage DC-DC converters.

Such fifth transistor $M_{N1}$ may have a second diode $D_2$ coupled between its source terminal and its drain terminal to be protected from reverse flowing currents, wherein such second diode $D_2$ may be already present in the body well of such fifth transistor $M_{N1}$.

The fifth transistor $M_{N1}$ is further configured to: have its drain terminal coupled to a first node LX, that is, to the drain terminal of such low-side power MOSFET $MN_{POWERFET}$ and to the coil, that is, the inductor L, have its source terminal coupled to the drain terminal of a sixth transistor, for instance, a MOSFET $M_{N4}$, for instance, an n-type MOSFET, and to a third node $N_1$ through a first resistor $R_1$, and have its gate terminal coupled with a node supplied with a voltage $EN_{SENSE}$ used to open/close such fifth transistor $M_{N1}$, such node supplied with the voltage $EN_{SENSE}$ being also coupled to the gate terminal of a seventh transistor, for instance, a MOSFET $M_{N2}$, for instance, an n-type MOSFET, and to the gate terminal of the sixth transistor $M_{N4}$, that is, the MOSFET $M_{N4}$, through an inverting stage.

Such third node $N_1$ being the DC-shifted (and fixed) low impedance node previously described, helpful in the conversion of the voltage drop on the low-side power MOSFET $MN_{POWERFET}$ into a corresponding coil current information.

The sixth transistor $M_{N4}$ is further configured to have its source terminal coupled to ground GND and to implement a low-voltage switch used to enhance the transient response of the low-side current sensor 40.

Therefore, the sixth transistor $M_{N4}$ is configured to prebias a first branch of such low-side current sensor 40 (that is, a branch comprising the fifth transistor $M_{N1}$, the first resistor $R_1$, an amplifier stage 400 (that is, the high-gain sensor negative feedback loop), an eighth transistor $M_{N3}$, a nineth transistor $M_{P3}$, and a tenth transistor $M_{P4}$), for instance, with a respective voltage $V_R$, in order to improve its transient response, thus, when the fifth transistor $M_{N1}$ is opened, the sixth transistor $M_{N4}$ is configured to maintain biased such first branch comprising the amplifier stage 400 (for this reason the gate terminal of the sixth transistor $M_{N4}$ is configured to be coupled with an inverted version of the signal of the node supplied with the voltage $EN_{SENSE}$).

Such sixth transistor $M_{N4}$ may not be used, thus, increasing the transient response of the low-side current sensor 40 but reducing also its the maximum quiescent current, thus, reducing current consumption.

The amplifier stage 400, for instance, implemented though an operational amplifier 400, corresponds to the high-gain sensor negative feedback loop acting on the gate of the corresponding output transistor, that is, the eighth transistor $M_{N3}$, in order to create the DC-shifted (and fixed) low impedance node $N_1$ at the source terminal of such eighth transistor $M_{N3}$, such amplifier stage 400 being further configured to: have its positive input terminal coupled to a node set to an input offset voltage $V^{IN}_{OFFSET}$, such input offset voltage $V^{IN}_{OFFSET}$ being used as an offset to measure even negative coil current values; have its negative input terminal coupled to the third node $N_1$, that is, the DC-shifted low impedance node, such third node $N_1$ being set to a first voltage $V_1$; and have its output terminal coupled with the gate terminal of the eighth transistor $M_{N3}$, that is, a MOSFET $M_{N3}$, for instance, an n-type MOSFET, that supplies with a gate voltage $V_G$.

The eighth transistor $M_{N3}$ is further configured to have its source terminal coupled with such third node $N_1$ and to have its drain terminal coupled to an input terminal $T_{IN}$ of a sensor current mirror 402, for instance, a conventional Low Voltage Cascode Current Mirror (LVCCM).

It is noted that even if in the following description a current mirror comprising MOSFETs of type p disposed in a cascode structure is presented, any other type of current mirror may be considered, for instance, a current mirror comprising MOSFETs of type p which are not disposed according to a cascode structure.

Such sensor current mirror 402 is configured to receive an input current from the input terminal $T_{IN}$, that is, the current flowing within the eighth transistor $M_{N3}$, and to provide an output current $I_{SENSE}$, whose value is proportional to such received input current by a factor M, for instance, if M=1 the value of such output current $I_{SENSE}$ replicates that of such received input current, from an output terminal $T_{OUT}$ which is set to an output voltage $V_{SENSE}$.

The sensor current mirror 402 comprises: the nineth transistor $M_{P3}$, that is, a MOSFET $M_{P3}$, for instance, a p-type MOSFET, which is configured to have its drain terminal coupled to the input terminal $T_{IN}$, to have its source terminal coupled to the drain terminal of the tenth transistor $M_{P4}$, that is, a MOSFET $M_{P4}$, for instance, a p-type MOSFET, and to have its gate terminal coupled to a node supplied with a cascode voltage of value $V_{CASC}$; the tenth transistor $M_{P4}$, that is, a MOSFET $M_{P4}$, which is configured to have its source terminal supplied with a second supply voltage $V_{DD}$, for instance, a voltage of 1.8 V, and its gate terminal coupled with the input terminal $T_{IN}$; an eleventh transistor $M_{P5}$, that is, a MOSFET $M_{P5}$, for instance, a p-type MOSFET, which is configured to have its drain terminal coupled to the output terminal $T_{OUT}$, to have its source terminal coupled to the drain terminal of a twelfth transistor $M_{P6}$, that is, a MOSFET $M_{P6}$, for instance, a p-type MOSFET, and to have its gate terminal coupled to the node supplied with the cascode voltage of value $V_{CASC}$; and the twelfth transistor $M_{P6}$, that is, a MOSFET $M_{P6}$, which is configured to have its source terminal supplied with the second supply voltage $V_{DD}$ and its gate terminal coupled with the input terminal $T_{IN}$.

It is noted that such sensor current mirror 402 may also be implemented using BJTs ("Bipolar Junction Transistors") or may have any other structure/components known in the art.

The seventh transistor $M_{N2}$, that is, the MOSFET $M_{N2}$, is further configured to have its source terminal coupled to ground GND and to have its drain terminal coupled to the output terminal Tour through a second matched resistor $R_2$, such seventh transistor $M_{N2}$ being configured to be a replica of the fifth transistor $M_{N1}$ in order to improve accuracy.

Such seventh transistor $M_{N2}$ may be configured to be always on (not shown in FIG. 9) or to be enabled just during a sensing activity of the low-side current sensor 40 (as in FIG. 9, for this reason the gate terminal of the seventh transistor $M_{N2}$ is coupled to the same node supplied with the voltage $EN_{SENSE}$) to reduce current consumption.

With such a configuration, the output voltage $V_{SENSE}$ is amplified by a given gain $G_{V_{SENSE}}$, that is:

$$G_{V_{SENSE}} = R_{POWERFET}^{ON} M\left(\frac{R_2 + R_{M_{N2}}^{ON}}{R_1 + R_{M_{N1}}^{ON}}\right)$$

wherein $$R_{POWERFET}^{ON}$$

is the value of the on-resistance, that is, the resistance value between the drain terminal and the source terminal of a MOSFET during operation, that is, when such MOSFET is closed, of the low-side power MOSFET $MN_{POWERFET}$, $$R_{M_{N2}}^{ON}$$

is the value of the on-resistance of the seventh transistor $M_{N2}$, and $$R_{M_{N1}}^{ON}$$

is the value of the on-resistance of the fifth transistor $M_{N1}$.

It is noted that the fifth transistor $M_{N1}$ and the seventh transistor $M_{N2}$ (that is a replica of the fifth transistor $M_{N1}$) may be simple switches and, typically, the value of their on-resistance may be smaller than $R_1$, thus:

$$R_{M_{N1}}^{ON} << R_1$$

$$R_{M_{N2}}^{ON} << R_1$$

Hence, such output voltage $V_{SENSE}$ may be obtained as:

$$V_{SENSE}(t) = V_{OFFSET}^{IN} M\left(\frac{R_2 + R_{M_{N2}}^{ON}}{R_1 + R_{M_{N1}}^{ON}}\right) + I_L(t) R_{POWERFET}^{ON} M\left(\frac{R_2 + R_{M_{N2}}^{ON}}{R_1 + R_{M_{N1}}^{ON}}\right)$$

wherein $V_{SENSE}$ (t) is the output voltage $V_{SENSE}$ at a time t, $I_L(t)$ is the coil current $I_L$ at the same time t, thus:

$$V_{SENSE}(t) = V_{OFFSET}^{SENSE} + I_L(t) G_{V_{SENSE}}$$

wherein $$V_{OFFSET}^{SENSE}$$

is the input offset voltage $V^{IN}_{OFFSET}$ amplified by the circuitry of FIG. 9, that is, of a factor equal to a gain $G_{SENSE}$, that is:

$$G_{SENSE} = M\left(\frac{R_2 + R_{M_{N2}}^{ON}}{R_1 + R_{M_{N1}}^{ON}}\right)$$

and it is further noted that:

$$G_{V_{SENSE}} = R_{POWERFET}^{ON} G_{SENSE}$$

Therefore, a desired amplification factor $G_{SENSE}$ may be obtained by properly choosing the ratio between the second matched resistor $R_2$ and the first resistor $R_1$, that is, $R_2/R_1$, and/or the factor M of the sensor current mirror 402.

As the desired amplification factor $G_{SENSE}$ may depend on the ratio between the second matched resistor $R_2$ and the first resistor $R_1$, such second matched resistor $R_2$ and such first resistor $R_1$ may be sized by choosing the value of one of such resistors considering desired current consumption and bandwidth and keeping their ratio at the desired value by dimensioning the value of the other resistor accordingly.

The low-side current sensor 40 may be used to sense a negative coil current, for instance, when a corresponding time-based DC-DC converter operates in Forced-Continuous Conduction Mode (forced-CCM) at no load or is configured to provide sinking capabilities.

In such cases, the input offset voltage $V^{IN}_{OFFSET}$ that is provided to the amplifier stage 400 is used as an offset to facilitate measuring such negative coil current, thus, the value of such input offset voltage $V^{IN}_{OFFSET}$ may be selected according to the most negative coil current $I_L$ that is to be sensed and for correctly biasing the amplifier stage 400.

The eighth transistor $M_{N3}$ may be sized in order to maximize its transconductance value $g_m$, for instance, it may be a natural MOSFET.

Depending on desired accuracy, bandwidth, and current consumption budget, the amplifier stage 400 may be a single stage OTA (Operational Transconductance Amplifier) or a two-stage class-A operational amplifier.

The aspect ratio W/L, that is, the ratio obtained by dividing the MOSFET channel width W by the MOSFET channel length L, of the seventh transistor $M_{N2}$ divided by the aspect ratio W/L of the fifth transistor $M_{N1}$ may be equal to the ratio between the second matched resistor $R_2$ and the first resistor $R_1$, thus:

$$\frac{\left(\frac{W}{L}\right)_{M_{N2}}}{\left(\frac{W}{L}\right)_{M_{N1}}} = \frac{R_2}{R_1}$$

To further describe the behavior of the low-side current sensor 40 a small signal analysis is reported in the following.

The small signal input impedance seen at the input node, that is, the first node LX, of such low-side current sensor 40 may be represented with the following equation:

$$z_{IN} = \frac{v_{LX}}{i_{IN}}$$

wherein $z_{IN}$ is such small signal input impedance, $v_{LX}$ is the small signal voltage measured on the first node LX, and $i_{IN}$ is the small signal current flowing within such input node, that is, the first node LX.

Such small signal input impedance $z_{IN}$ may be further expressed as:

$$z_{IN}(S) \cong R_1 + \frac{1}{[1 + A(S)]gm_{M_{N3}}}$$

wherein $gm_{M_{N3}}$ is the transconductance of the eighth transistor $M_{N3}$, and A(S) is the gain of the amplifier used in the high-gain sensor negative feedback loop, for instance, of the operational amplifier 400.

Therefore, with such a small signal analysis it is noted that the low-side current sensor 40 with the structure described herein may be configured to have a low input impedance, and thus, for instance, if the high-gain sensor negative feedback loop lags in varying the value of the gate voltage $V_G$, a corresponding high amount of current may still be managed by the eighth transistor $M_{N3}$. Therefore, such low-side current sensor 40 may advantageously be configured to have a good transient response.

The good transient response of such low-side current sensor 40 (resulting from the capability of the eighth transistor $M_{N3}$ to manage a high amount of current flowing therein when the high-gain sensor negative feedback loop lags in varying the value of the gate voltage $V_G$) may result from the fact that at frequencies high enough so that the gain of the amplifier used in the high-gain sensor negative feedback loop A(s) is low (that is, under a given threshold), that is, if the amplifier stage 400 does not provide a sufficient gain, the high-gain sensor negative feedback loop lags to respond, and, therefore, any variation in the value of the current flowing within the eighth transistor $M_{N3}$ is not managed by such high-gain sensor negative feedback loop, but only by such eighth transistor $M_{N3}$.

Therefore, at high frequencies the value of the gate voltage $V_G$ may not be moved but still $z_{IN}$ may remain about $R_1$ thanks to a high $gm_{M_{N3}}$, that is, $$z_{IN}(S) \cong R_1 + \frac{1}{gm_{M_{N3}}}.$$

The closed loop transfer function of the low-side current sensor 40 may be expressed with the following formula:

$$v_{SENSE}(S) = MR_2\frac{v_{LX}}{z_{IN}(S)}$$

wherein $v_{SENSE}(S)$ is the small signal voltage measured on the output terminal $T_{OUT}$, and therefore:

$$\frac{v_{SENSE}(S)}{v_{LX}} = \frac{MR_2}{z_{IN}(S)}$$

that is:

$$\frac{v_{SENSE}(S)}{v_{LX}} \cong \frac{MR_2}{R_1 + \frac{1}{[1 + A(S)]gm_{M_{N3}}}}$$

If the amplifier used in the high-gain sensor negative feedback loop, for instance the operational amplifier 400, is configured to have a high gain A(S) and if the transconductance of the eighth transistor $M_{N3}$ $gm_{M_{N3}}$ is configured to remain high, then:

$$z_{IN} \cong R_1$$

and:

$$\frac{v_{SENSE}}{v_{LX}} \cong \frac{MR_2}{R_1}$$

Therefore, even with this analysis may be confirmed that the desired amplification factor $$\frac{v_{SENSE}}{v_{LX}}$$

may be obtained by properly choosing the ratio between the second matched resistor $R_2$ and the first resistor $R_1$, that is, $R_2/R_1$, and/or the factor M of the sensor current mirror 402.

In addition, the loop gain LG of the high gain sensor negative feedback loop may be expressed as:

$$L_G = \frac{A(S)}{\left(1 + \frac{1}{R_1 gm_{M_{N3}}}\right)}$$

To summarize, a DC-DC converter 30 as described herein may further comprises a low-side switch, that is, the low-side switch LS, for instance, implemented using the low-side power MOSFET $MN_{POWERFET}$, configured to be coupled between ground GND and a second node, that is, the first node LX, having coupled therewith a high-side switch, that is, the high-side switch HS, and an inductor L.

Such low-side switch LS, for instance, implemented using a low-side power MOSFET $MN_{POWERFET}$, is further configured to be coupled through such second node LX to a current sensor 40, such current sensor 40 being configured to sense a coil current $I_L$ flowing within such inductor L.

Such current sensor 40 comprises: a sensor transistor, that is, the eight transistor $M_{N3}$, configured to have a current source terminal, for instance, either a source terminal or an emitter terminal, coupled to the low side-switch LS, for instance, implemented using a low-side power MOSFET $MN_{POWERFET}$, a control terminal, for instance, either a gate terminal or a base terminal, coupled to a sensor negative feedback loop 400, and a current drain terminal, for instance, either a drain terminal or a collector terminal, coupled to a first branch of a sensor current mirror 402; the sensor negative feedback loop 400 configured to supply such control terminal of such sensor transistor $M_{N3}$ with a control voltage, that is, the gate voltage $V_G$; the sensor current mirror 402 configured to receive a first sensor current from such current drain terminal of the sensor transistor $M_{N3}$ through such first branch of the sensor current mirror 402, apply a gain, for instance, the factor M, to such first sensor current to obtain a second sensor current, and to provide such second sensor current to a load, for instance, comprising the second matched resistor $R_2$ and the seventh transistor $M_{N2}$, through a second branch of the sensor current mirror 402.

Such sensor negative feedback loop 400 may comprise a high-gain negative feedback loop and the current source terminal of the sensor transistor $M_{N3}$ configured to be coupled to the low side switch LS, for instance, implemented using a low-side power MOSFET $MN_{POWERFET}$, may comprise a DC-shifted low impedance node $N_1$.

Such low side switch LS, for instance, implemented using a low-side power MOSFET $MN_{POWERFET}$, may be configured to be coupled to such current sensor 40 through a sensor switch, that is, the fifth transistor $M_{N1}$, such sensor switch $M_{N1}$ being configured to implement a protection function comprising: making the sensor switch $M_{N1}$ conductive in response to such low-side switch LS, for instance, implemented using a low-side power MOSFET $MN_{POWERFET}$, being conductive; and making the sensor switch $M_{N1}$ non-conductive prior to such low-side switch LS, for instance, implemented using a low-side power MOSFET $MN_{POWERFET}$, being non-conductive.

Such load may comprise a replica transistor, that is, the seventh transistor $M_{N2}$, configured to have a current source terminal coupled to ground GND, to have a current drain terminal coupled to such second branch of the sensor current mirror 402, and to remain conductive in response to such sensor switch $M_{N1}$ being conductive.

The current source terminal of the sensor transistor $M_{N3}$ may be further configured to be coupled to the current drain terminal of a biasing transistor, that is, the sixth transistor $M_{N4}$, wherein such biasing transistor $M_{N4}$ is configured to have its current source terminal coupled to ground GND and to maintain the current source terminal of the sensor transistor $M_{N3}$ biased by remaining conductive in response to such sensor switch $M_{N1}$ being non-conductive.

To sense both positive and negative coil currents, such sensor negative feedback loop 400 may be further configured to receive an offset voltage, that is, the input offset voltage $V^{IN}_{OFFSET}$, wherein such control voltage $V_G$ is a function of such received offset voltage $V^{IN}_{OFFSET}$.

It is noted that the low-side current sensor 40 with the structure described herein may be used to obtain a low-side current sensor 40' configured to detect valleys or peaks of the coil current $I_L$ by adding (few) components.

To obtain such low-side current sensor 40' configured to detect valleys or peaks of the coil current $I_L$ a comparator is used to compare the amplified and DC-shifted voltage measured on the first node LX (corresponding to the drain-source voltage $V_{DS}$, that is, the voltage between the drain terminal and the source terminal, of the low-side power MOSFET $MN_{POWERFET}$), that is, the output voltage $V_{SENSE}$, with a selected voltage threshold $V_{VY}^{TH}$ that is chosen in order to select a desired triggering value for detecting the valleys/peaks of the output voltage $V_{SENSE}$, which corresponds to valleys/peaks of the coil current $I_L$ and are indicative of valleys/peaks in such voltage measured on the first node LX.

Figure 10:
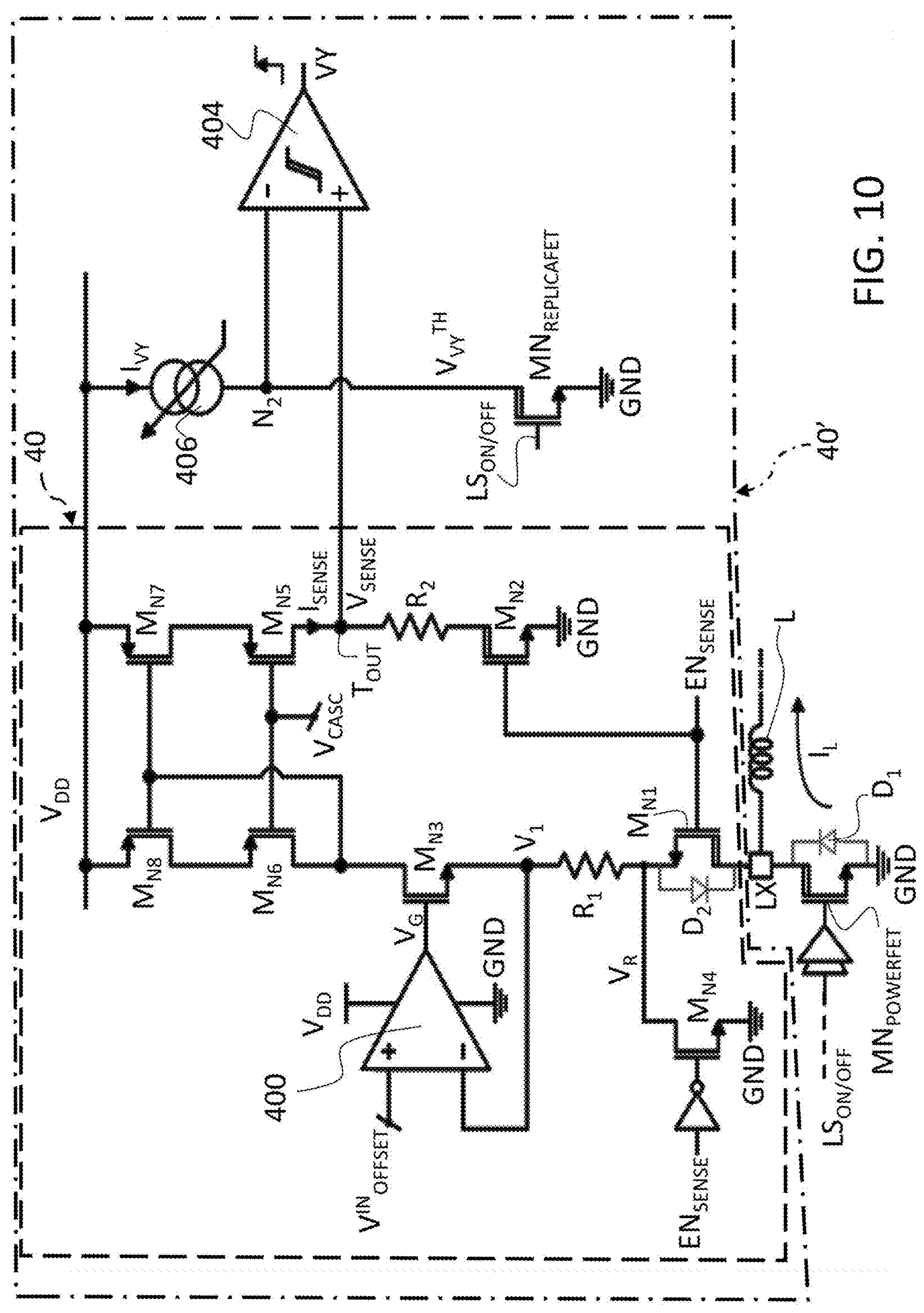

FIG. 10 is a low-side current sensor 40' configured to detect valleys of the coil current $I_L$ and to be used with DC-DC converters, for instance, with time-based DC-DC converters 30, 30$_1$, 30$_2$, 30$_3$, or 30$_4$ of FIGS. 4 to 8 respectively.

The low-side current sensor 40 of FIG. 9 may be combined with additional components in order to obtain the valley detector low-side current sensor 40' of FIG. 10.

For instance, such a valley detector low-side current sensor 40' may be used to monitor the valleys of the coil current $I_L$ flowing within an inductor L of a buck DC-DC converter and to provide a feedback signal VY when a corresponding given voltage threshold $V_{VY}^{TH}$ is reached.

It is noted that such low-side current sensor 40' illustrated in FIG. 10 may be easily modified to implement a peak detector low-side current sensor 40' to be used in boost DC-DC converters, such peak detector low-side current sensor 40' being configured to detect peaks of the coil current $I_L$, for instance, by changing the sign of the comparison performed by a comparator 404.

For instance, such peak detector low-side current sensor 40' may be used to monitor the peaks of the coil current $I_L$ flowing within an inductor L of a boost DC-DC converter and to provide a feedback signal VY when a corresponding given voltage threshold $V_{VY}^{TH}$ is reached, the value of such given voltage threshold $V_{VY}^{TH}$ being higher than the one used for the valley detector low-side current sensor 40'.

A replica transistor, for instance, a MOSFET $MN_{REPLICAFET}$, for instance, an n-type MOSFET, is configured to replicate in a different scale the low-side power MOSFET $MN_{POWERFET}$, therefore, being a scaled version of the low-side power MOSFET $MN_{POWERFET}$.

Therefore, the replica MOSFET $MN_{REPLICAFET}$ may be configured to have: its source terminal coupled to ground GND; its gate terminal configured to receive the low side switch signal $LS_{ON/OFF}$ indicating to such replica transistor $MN_{REPLICAFET}$ to open or close, such low side switch signal $LS_{ON/OFF}$ being received also at the gate terminal of the low-side power MOSFET $MN_{POWERFET}$ and indicates to such low-side power MOSFET $MN_{POWERFET}$ to open or close; and its drain terminal coupled to a fourth node $N_2$, to which are coupled also a controlled current source 406 and a positive input terminal of a comparator 404, therefore, such replica MOSFET $MN_{REPLICAFET}$ is further configured to supply such fourth node $N_2$ with a voltage to be used by the comparator 404 as the voltage threshold $V_{VY}^{TH}$, such voltage threshold $V_{VY}^{TH}$ being a threshold for the drain-source voltage $V_{DS}$, that is, the voltage between the drain terminal and the source terminal, of the low-side power MOSFET $MN_{POWERFET}$ (as previously described).

The controlled current source 406 is configured to be coupled between the second supply voltage $V_{DD}$ and the fourth node $N_2$, that is, both the drain terminal of the replica MOSFET $MN_{REPLICAFET}$ and the positive input terminal of the comparator 404.

Such controlled current source 406 is further configured to generate a variable current $I_{VY}$ whose variable value may be obtained, for instance, according to the formula:

$$I_{VY} = \frac{MR_2 I_{VY}^{TH}}{R_1 K} + I_{OFFSET}^{TH}$$

wherein $$I_{VY}^{TH}$$

is a coil current threshold flowing within the low-side power MOSFET $MN_{POWERFET}$, $$I_{OFFSET}^{TH}$$

is an offset current which is a constant contribution to be summed in order to obtain the variable current $I_{VY}$, and K is the ratio between the aspect ratios of the low-side power MOSFET $MN_{POWERFET}$ and such replica MOSFET $MN_{REPLICAFET}$.

Therefore, such K value may be obtained by dividing the aspect ratio W/L, that is, the ratio obtained by dividing the MOSFET channel width W by the MOSFET channel length L, of such low-side power MOSFET $MN_{POWERFET}$ by the aspect ratio W/L of such replica MOSFET $MN_{REPLICAFET}$, thus:

$$K = \frac{\left(\frac{W}{L}\right)_{MN_{POWERFET}}}{\left(\frac{W}{L}\right)_{MN_{REPLICAFET}}}$$

such value K being higher than 1 ("one") in order to minimize current consumption, thus:

$K \gg 1$

Such voltage threshold $V_{VY}^{TH}$ may be obtained by sourcing the variable current $I_{VY}$ on such replica MOSFET $MN_{REPLICAFET}$, facilitating the selection of a desired triggering value for detecting the valleys of the coil current $I_L$.

A negative input terminal of the comparator 404 is configured to be coupled to the output terminal $T_{OUT}$ of the low-side current sensor 40 of FIG. 9, which is set to an output voltage $V_{SENSE}$ and wherein flows an output current $I_{SENSE}$, such comparator 404 being configured to compare the signals received at its input terminals, that is, at its positive and negative input terminals, and to provide a comparison signal VY indicative of the result of such comparison operation.

It is noted that, according to the description of FIG. 9, the output voltage $V_{SENSE}$ may correspond to an amplified and DC-shifted, that is, subject to a voltage shift of a given DC value, version of the drain-source voltage $V_{DS}$, that is, the voltage between the drain terminal and the source terminal, of the low-side power MOSFET $MN_{POWERFET}$.

To summarize, such second sensor current provided by such second branch of such sensor current mirror 402 on such load $R_2$, $M_{N2}$ is configured to generate a sense voltage, that is, the output voltage $V_{SENSE}$, such sense voltage $V_{SENSE}$ being indicative of the coil current $I_L$ flowing within such inductor L, and wherein such DC-DC converter 30 further comprises a comparator 404 configured to receive such sense voltage $V_{SENSE}$ at a first input terminal and a selected voltage threshold $V_{VY}^{TH}$ at a second input terminal, and to compare such sense voltage $V_{SENSE}$ with such selected voltage threshold $V_{VY}^{TH}$ by checking if such sense voltage $V_{SENSE}$ reaches such selected voltage threshold $V_{VY}^{TH}$.

It is noted that such amplification and such DC-shifting may facilitate providing an output positive signal, that is, a positive output voltage $V_{SENSE}$, which, for instance, may be used by the comparator 404 to detect either valleys or peaks (according to the sign of the comparison performed by such comparator 404 and the topology of the DC-DC converter, for instance, buck, boost, or others).

It is noted that in addition to facilitate the controlling and monitoring of the switching activity of DC-DC converters, the information about the instantaneous coil current $I_L$ retrieved by embodiments of the low-side current sensor 40 or 40' as disclosed herein may also facilitate:

- loop stability compensation operations, since information about such coil current peaks and/or valleys may be useful in many control schemes of DC-DC converters, for instance, Current-Mode-Controls ("CMC"), Peak-Current-Mode-Control ("PCMC"), Valley-Current-Mode-Control ("VCMC"), or the like;
- operations aiming at improving safety, since such instantaneous, that is, real time and not averaged, coil current may be monitored in order to avoid exceeding predefined values (for instance, avoiding to reach dangerous values), therefore, to activate Over-Current-Protections ("OCPs"), Short-Circuit-Protections ("SCPs"), or the like;
- performing auxiliary measurements and adding auxiliary features, since the retrieved values of the instantaneous coil current may be averaged, for instance, low-pass filtered, and, optionally, weighted with the duty-cycle of the corresponding DC-DC converter, in order to obtain average steady-state information about the coil current, an input/line current, an output/load current, or the like, in order to: implement optimized and tailored features, such as multi-phase management according to the load demand, dynamic-transistor-size-control to optimize efficiency over wide load range, and/or the like, and sense and measure values in response to user requests, such as average current drained from the DC-DC converter input supply, average current provided to the output load, and/or the like;
- obtaining a low-side current sensor with a fast transient response, which is especially useful in converters characterized by high switching frequencies and/or tight actuation times, that is, converters having a small time to turn on $T_{ON}$, for instance, in "boost-like" topologies, or converters having a small time to turn off $T_{OFF}$, for instance, in "buck-like" topologies, as low-side current sensors as described herein may rapidly settle and track the value of the coil current;
- sensing such coil current also in High-Voltage DC-DC converters, therefore, being compliant with DC-DC converters operating with high-input voltages and/or high-output voltages and/or with broad voltage ranges;

sensing such coil current even when its value is negative, for instance, when a corresponding DC-DC converter operates in forced-CCM ("Forced-Continuous Conduction Mode") at no load or in case of requested DC-DC sinking capabilities;

amplifying of a given gain factor the sensed coil current, therefore, providing a coil current information which is magnified by such given gain factor (that is, either current-to-voltage or current-to-current) useful, for instance, in CMC ("Current-Mode Control") as such given gain factor may influence the stability and performance of loops of the DC-DC converters operated in such CMC mode;

obtaining a low-side current sensor complying with low voltage supplies, for instance, of 1.8V, as such low voltage supplies are usually found in PMICs/SoCs/DC-DCs, and, in addition, low-side current sensors as described herein may be implemented analogically, using standard GO1 CMOS devices and without any special/extra mask requirement; and lowering costs as neither off-chips extra-components nor extra voltage supplies/rails, extra-pads/balls, extra process masks are used and as low-side current sensors as described herein may be characterized by a small silicon area and minimal added consumption that may not affect the efficiency and the quiescent current consumption of a corresponding DC-DC converter.

Advantageously, the effects described above may be obtained through low-side current sensors as described herein even in presence of: PVT ("Process, Voltage and Temperature") variations; different operation conditions and parameters, for instance, different values for one or more between the input voltage $V_{IN}$, the output voltage $V_{OUT}$, a load coupled to a respective DC-DC converter, the inductor L, the output capacitor $C_O$, the switching frequency $F_{SW}$ of the PWM signal $D_{PWM}$, parasites elements, or the like; different application scenarios; different conditions that may happen after final-tests, packaging, and assembly, for instance, aging, soldering, or the like.

Therefore, such low-side current sensors may be independent from the direction of the coil current flowing within a respective inductor of a DC-DC converter and from the DC-DC converter operation modes (such as Continuous Conduction Mode (CCM), Discontinuous Conduction Mode (DCM), Forced-Continuous Conduction Mode (forced-CCM), or the like).

It is noted that such additional current sensor described herein may as well be used in the previously mentioned context of applications.

Solutions as described herein facilitate obtaining time-based DC-DC converters comprising an additional negative feedback loop, such negative feedback loop comprising: a pair of phase detectors configured to detect the common-mode frequency of signals received by current controlled oscillators of a corresponding DC-DC converter and to obtain balanced PWM signals; and an up/down charge pump comprising, for instance, a filtering stage, and configured to receive such balanced PWM signals and to generate (as a function of such balanced PWM signals) a control signal used to close such negative feedback loop by acting on a controlled current generator, such controlled current generator being configured to provide a biasing current to such current controlled oscillators of the corresponding DC-DC converter.

Solutions as described herein may include an additional low-side current sensor used to sense the current flowing within a coil of a DC-DC converter in order to facilitate further controlling and monitoring strategies, such sensing being performed by DC-shifting (and amplifying) such current flowing within the coil.

Thus, solutions as described herein facilitate controlling and monitoring the switching activity of a time-based DC-DC converter without impacting the regulation of such DC-DC converter in order to increase its performance, for instance, such controlling may be provided by aligning and locking the switching activity of such time-based DC-DC converter to a given reference clock signal, while further controls and monitoring may be provided by such current sensor that is configured to sense both positive and negative coil currents and to operate irrespective of the operative conditions of the time-based DC-DC converter, providing a fast transient response.

Thus, solutions as described herein may increase the performance and flexibility of time-based DC-DC converters, in fact, such time-based DC-DC converters may be used in various applications since it is possible to control and monitor their switching activity.

Without prejudice to the underlying principles, the details and the embodiments may vary, even significantly, with respect to what has been described by way of example only without departing from the scope of the embodiments.

The claims are an integral part of the technical teaching provided in respect of the embodiments.

The extent of protection is determined by the annexed claims.

The invention claimed is:

1. A time-based DC-DC converter circuit, comprising:

a switching circuit controlled by a pulse width modulation switching signal generated in response to a first oscillator signal and a second oscillator signal;

a first current controlled oscillator configured to generate the first oscillator signal based on a first control signal;

a second current controlled oscillator configured to generate the second oscillator signal based on a second control signal;

a controlled current generator configured to generate a controlled current based on a feedback control signal, wherein said first control signal and said second control signal are a function of said controlled current; and a negative feedback loop configured to receive the first oscillator signal from the first current controlled oscillator and the second oscillator signal from the second current controlled oscillator and to generate the feedback control signal as a function of said first oscillator signal and said second oscillator signal;

said negative feedback loop comprising:

detector circuitry configured to receive the first oscillator signal, the second oscillator signal, and a reference signal and generate at least two binary signals comprising a first binary signal based on a phase difference between the first oscillator signal and the reference signal and a second binary signal based on a phase difference between the second oscillator signal and the reference signal; and charge pump circuitry configured to receive the at least two binary signals and to generate the feedback control signal based on said at least two binary signals.

2. The converter circuit according to claim 1, wherein:

the first oscillator signal has a first phase;

the second oscillator signal has a second phase; and the reference signal has a reference phase;

wherein the detector circuitry comprises:

a first phase detector configured to generate the first binary signal as a function of a difference between the first phase and the reference phase; and a second phase detector configured to generate the second binary signal as a function of a difference between the second phase and the reference phase;

wherein the charge pump is configured to generate the feedback control signal based on the first binary signal and the second binary signal.

3. The converter circuit according to claim 2, wherein the reference signal having said reference phase comprises a clock signal.

4. The converter circuit according to claim 2, wherein said reference phase is selectively variable out of a plurality of reference phases.

5. The converter circuit according to claim 1, wherein the first oscillator signal, the second oscillator signal from the second current controlled oscillator, and the reference signal have a same frequency in a steady-state condition.

6. The converter circuit according to claim 1, wherein the charge pump circuitry comprises:

a first charge pump current generator configured to be coupled to ground and to generate a first pump current;

a second charge pump current generator configured to be supplied with a supply voltage and to generate a second pump current;

a first switch coupled between a node and said first charge pump current generator to receive the first binary signal from said detector circuitry and to switch between conductive and non-conductive in response to said first binary signal;

a second switch coupled between said node and said second charge pump current generator to receive the second binary signal from said detector circuitry and to switch between conductive and non-conductive in response to said second binary signal; and a capacitor configured to be coupled between said node and ground to be charged via the second pump current in response to the second switch being conductive and to be discharged via the first pump current in response to the first switch being conductive, wherein a charge voltage of said capacitor provides the feedback control signal for controlling the controlled current generator.

7. The converter circuit according to claim 6, wherein said first pump current generated by said first charge pump current generator is equal to said second pump current generated by said second charge pump current generator.

8. The converter circuit according to claim 1, wherein the controlled current generator comprises:

a voltage-to-current buffer configured to receive the feedback control signal, apply a gain to said feedback control signal and use said feedback control signal having the gain applied thereto to drive a transistor configured to facilitate flow of a mirror current therein; and a current mirror configured to receive said mirror current in a first mirror branch and to generate said controlled current by mirroring said mirror current in at least one second mirror branch.

9. The converter circuit according to claim 1, further comprising a low-side switch configured to be coupled between ground and a second node having coupled therewith a high-side switch and an inductor; wherein said low-side switch is further configured to be coupled through said second node to a current sensor, said current sensor being configured to sense a coil current flowing within said inductor.

10. The converter circuit according to claim 9, wherein said current sensor comprises:

a sensor transistor configured to have a current source terminal coupled to the low side-switch, a control terminal coupled to a sensor negative feedback loop, and a current drain terminal coupled to a first branch of a sensor current mirror;

the sensor negative feedback loop configured to supply said control terminal of said sensor transistor with a control voltage;

the sensor current mirror configured to receive a first sensor current from said current drain terminal of the sensor transistor through said first branch of the sensor current mirror, apply a gain to said first sensor current to obtain a second sensor current, and to provide said second sensor current to a load through a second branch of the sensor current mirror.

11. The converter circuit according to claim 10, wherein:

said sensor negative feedback loop comprises a high-gain negative feedback loop; and the current source terminal of the sensor transistor configured to be coupled to the low side switch comprises a DC-shifted low impedance node.

12. The converter circuit according to claim 9, wherein said low side switch is configured to be coupled to said current sensor through a sensor switch, said sensor switch being configured to implement a protection function comprising:

making the sensor switch conductive in response to said low-side switch being conductive, and making the sensor switch non-conductive prior to said low-side switch being non-conductive.

13. The converter circuit according to claim 12, wherein said load comprises a replica transistor configured to have a current source terminal coupled to ground, to have a current drain terminal coupled to said second branch of the sensor current mirror, and to remain conductive in response to said sensor switch being conductive.

14. The converter circuit according to claim 12, wherein the current source terminal of the sensor transistor is further configured to be coupled to the current drain terminal of a biasing transistor, wherein said biasing transistor is configured to have its current source terminal coupled to ground and to maintain the current source terminal of the sensor transistor biased by remaining conductive in response to said sensor switch being non-conductive.

15. The converter circuit according to claim 10, wherein said sensor negative feedback loop is further configured to receive an offset voltage, wherein said control voltage is a function of said received offset voltage.

16. The converter circuit according to claim 10, wherein said second sensor current provided by said second branch of said sensor current mirror on said load is configured to generate a sense voltage, said sense voltage being indicative of the coil current flowing within said inductor, and further comprising a comparator configured to receive said sense voltage at a first input terminal and a selected voltage threshold at a second input terminal, and to compare said sense voltage with said selected voltage threshold by checking if said sense voltage reaches said selected voltage threshold.

17. A method, comprising:

controlling a switching circuit of a time-based DC-DC converter circuit with a pulse width modulation switching signal generated in response to a first oscillator signal and a second oscillator signal;

generating, via a first current controlled oscillator, the first oscillator signal based on a first control signal;

generating, via a second current controlled oscillator, the second oscillator signal based on a second control signal;

generating, via a controlled current generator, a controlled current based on a feedback control signal, wherein said first control signal and said second control signal are a function of said controlled current; and receiving, via a negative feedback loop, the first oscillator signal from the first current controlled oscillator and the second oscillator signal from the second current controlled oscillator and generating the feedback control signal as a function of said first oscillator signal and said second oscillator signal;

wherein generating the feedback control signal comprises:

generating at least two binary signals comprising a first binary signal based on a phase difference between the first oscillator signal and the reference signal and a second binary signal based on a phase difference between the second oscillator signal and the reference signal; and controlling charge pump circuitry based on said at least two binary signals to output the feedback control signal.

18. The method according to claim 17, wherein:

the first oscillator signal has a first phase;

the second oscillator signal has a second phase; and the reference signal has a reference phase;

wherein generating at least two binary signals comprises:

detecting a difference between the first phase and the reference phase to generate the first binary signal; and detecting a difference between the second phase and the reference phase to generate the second binary signal;

wherein controlling charge pump circuitry comprises controlling based on the first binary signal and the second binary signal.

19. The method according to claim 18, wherein the reference signal having said reference phase comprises a clock signal.

20. The method according to claim 18, wherein said reference phase is selectively variable out of a plurality of reference phases.

* * * * *